(12) United States Patent
Pan

(10) Patent No.: US 11,455,430 B2
(45) Date of Patent: Sep. 27, 2022

(54) SECURE ELEMENT AND RELATED DEVICE

(71) Applicant: Huawei Technologies Co., Ltd., Shenzhen (CN)

(72) Inventor: Shilin Pan, Shanghai (CN)

(73) Assignee: Huawei Technologies Co., Ltd, Shenzhen (CN)

( * ) Notice: Subject to any disclaimer, the term of this patent is extended or adjusted under 35 U.S.C. 154(b) by 98 days.

(21) Appl. No.: 16/849,318

(22) Filed: Apr. 15, 2020

(65) Prior Publication Data

US 2020/0242274 A1    Jul. 30, 2020

Related U.S. Application Data

(63) Continuation of application No. PCT/CN2017/106396, filed on Oct. 16, 2017.

(51) Int. Cl.
*G06F 21/74* (2013.01)
*G06F 12/1009* (2016.01)
(Continued)

(52) U.S. Cl.
CPC .......... *G06F 21/74* (2013.01); *G06F 12/1009* (2013.01); *H04L 9/14* (2013.01);
(Continued)

(58) Field of Classification Search
None
See application file for complete search history.

(56) References Cited

U.S. PATENT DOCUMENTS 6,453,413 B1 *  9/2002  Chen .................... G06F 8/63
                                                      709/221
8,037,243 B1 * 10/2011  Gasser .................. G06F 8/63
                                                      711/114
(Continued)

FOREIGN PATENT DOCUMENTS

CN        101149688 A      3/2008
CN        102595404 A      7/2012
(Continued)

OTHER PUBLICATIONS

González, J. et al., "Operating System Support for Run-Time Security with a Trusted Execution Environment;—Usage Control and Trusted Storage for Linux-based Systems—", Submitted Jan. 31, 2015; last revision May 30, 2015, 192 pages.
(Continued)

*Primary Examiner* — Benjamin E Lanier
(74) *Attorney, Agent, or Firm* — Slater Matsil, LLP

(57) ABSTRACT

The present application provides a secure element comprising a processor and a memory integrated into a semiconductor chip; the memory is configured to provide a storage space for the processor to load and run a secure program, the secure program includes an image of a secure operating system, and the image of the secure operating system includes a system image resident segment and a system image dynamic loading segment. The processor is configured to: divide the system image dynamic loading segment into a plurality of pages, where each of the plurality of pages includes some content of the system image dynamic loading segment; perform security processing on each of the plurality of pages; and migrate each security-processed page to an external storage of the secure element.

18 Claims, 10 Drawing Sheets

(51) Int. Cl.
*H04L 9/14* (2006.01)
*H04L 9/32* (2006.01)

(52) U.S. Cl.
CPC .......... *H04L 9/3228* (2013.01); *H04L 9/3242* (2013.01); *H04L 9/3247* (2013.01)

(56) References Cited

U.S. PATENT DOCUMENTS

| | | | |
|---|---|---|---|
| 9,165,143 B1 | 10/2015 | Sanders et al. | |
| 10,175,995 B1* | 1/2019 | Mitra | G06F 1/3287 |
| 2006/0026429 A1* | 2/2006 | Kudo | G06F 21/575 |
| | | | 713/173 |
| 2008/0082828 A1 | 4/2008 | Jennings et al. | |
| 2009/0222675 A1 | 9/2009 | Lange et al. | |
| 2015/0370726 A1* | 12/2015 | Hashimoto | G06F 12/1009 |
| | | | 711/163 |
| 2016/0026783 A1* | 1/2016 | Buer | G06F 21/79 |
| | | | 711/103 |
| 2016/0371688 A1 | 12/2016 | Hammad | |
| 2017/0103378 A1 | 4/2017 | Pan | |
| 2017/0160981 A1* | 6/2017 | B | G06F 3/0644 |
| 2017/0230185 A1* | 8/2017 | Varadhan | H04L 9/14 |
| 2018/0060250 A1* | 3/2018 | Hildesheim | G06F 12/1491 |
| 2019/0050844 A1 | 2/2019 | Pan | |
| 2019/0139026 A1 | 5/2019 | Tan et al. | |
| 2019/0222423 A1* | 7/2019 | Takemori | G07C 5/008 |

FOREIGN PATENT DOCUMENTS

| | | |
|---|---|---|
| CN | 103503010 A | 1/2014 |
| CN | 104778794 A | 7/2015 |
| CN | 105678191 A | 6/2016 |
| CN | 105912272 A | 8/2016 |
| CN | 105989306 A | 10/2016 |
| CN | 106127483 A | 11/2016 |

OTHER PUBLICATIONS

Zhou, X., "Mobile IP and Security" (with English abstract), Modern Communication High-Tech Series, Sep. 2005, 8 pages.

* cited by examiner

SECURE ELEMENT AND RELATED DEVICE

CROSS-REFERENCE TO RELATED APPLICATIONS

This application is a continuation of International Application No. PCT/CN2017/106396, filed on Oct. 16, 2017. The disclosure of which is hereby incorporated by reference in its entirety.

TECHNICAL FIELD

This application relates to the field of mobile communications technologies, and in particular, to a secure element and a related device.

BACKGROUND

Mobile payment is a service mode in which a user is allowed to use a mobile terminal, for example, a mobile phone, a tablet computer, or a wearable apparatus, to pay for purchased goods or services. Currently, a mobile terminal implements mobile payment in three solutions: a secure digital (SD) card solution, a subscriber identity module (SIM) solution, and an all-terminal solution of combining near field communication (NFC) and a secure element (SE). Currently, the all-terminal solution of combining near field communication and a secure element is becoming a mainstream solution for implementing mobile payment.

With development of mobile application scenarios, more types of application software are run by the secure element, and system service requirements are also increasing. For example, there are more concurrent applications, to be specific, multi-channel application processing is supported at the same time. More platform functions result in an increasing large system image (OS image). Consequently, a requirement for a memory space used for running corresponding application software or an operating system in the secure element is also increasing. However, the secure element can be run only in an internal RAM, and cannot directly access a larger external storage. As a result, a current service growth requirement cannot be met. For this disadvantage, dynamic loading may be implemented by using a memory management unit (MMU) or a dedicated address mapping module. A basic procedure is as follows:

1. A basic program is loaded to the RAM in the secure element for running. The program resides in an internal RAM space.

2. The MMU or an address mapping unit is configured to translate a valid address. Based on such a hardware design, a page table may be used to cover all virtual addresses. However, only an actually mapped part occupies a physical address of the internal RAM. Alternatively, only valid address mapping is configured.

3. When a processor runs, if an unmapped address or an invalid address is obtained during instruction or data obtaining, the processor handles an exception, for example, a hardware fault or an address translation exception.

4. During an exception or interrupt, the processor pushes context into a stack to enter an entry of an exception handling function. In the exception handling function, corresponding data in an external DDR or memory is moved to the internal RAM based on a page size and the unmapped address. In addition, a page table is configured, to configure the unmapped address to valid mapping.

5. Return to the context that is before the interrupt. Because the address mapping is valid, the program is executed normally.

The foregoing uses the dynamic loading technology to resolve a problem that a memory is insufficient because a quantity of services in the secure element increases. However, how to effectively ensure security of a program that is dynamically loaded to a secure element is an urgent problem to be resolved.

SUMMARY

Embodiments of the present application provide a secure element and a related device, to ensure that a secure operating system run by the secure element is run securely when the secure operating system is dynamically loaded to a memory of the secure element.

According to a first aspect, an embodiment of the present application provides a secure element. The secure element may include a processor and a memory. The processor and the memory are integrated into a semiconductor chip. The memory is configured to provide a storage space for the processor to load and run a secure program. The secure program includes an image of a secure operating system. The image of the secure operating system includes a system image resident segment and a system image dynamic loading segment. The system image resident segment resides in the memory when the processor runs the secure operating system. The processor is configured to: divide the system image dynamic loading segment into a plurality of pages, where each of the plurality of pages includes some content of the system image dynamic loading segment; perform security processing on each of the plurality of pages; and migrate each security-processed page to an external storage for the secure element.

According to the technical solution provided in the first aspect, the processor of the secure element can divide a dynamic loading part of the secure operating system into a plurality of pages, perform security processing on each of the plurality of pages, and then store each security-processed page into the external storage for the secure element, so as to ensure that the dynamic loading part is run securely when the dynamic loading part is loaded from the external storage to the memory of the secure element.

According to a second aspect, an embodiment of the present application provides a secure element. The secure element may include a processor and a memory. The processor and the memory are integrated into a semiconductor chip. The memory is configured to provide a storage space for the processor to load and run a secure program. The secure program includes an image of a secure operating system. The image of the secure operating system includes a system image resident segment and a system image dynamic loading segment. The system image resident segment resides in the memory when the processor runs the secure operating system. The system image dynamic loading segment is divided into a plurality of pages, and security processing has been performed on content on each of the plurality of pages. The processor is configured to: when running the secure operating system, load at least one of the plurality of pages to the memory, and perform security verification on the at least one page. The security verification is an inverse operation of the security processing.

According to the technical solution provided in the second aspect, the processor of the secure element can perform security verification on the security-processed plurality of pages of the system image dynamic loading segment, to ensure that the dynamic loading part is run securely when the dynamic loading part is loaded from an external storage to the memory of the secure element.

According to a third aspect, an embodiment of the present application provides a secure element. The secure element may include a processor and a memory. The processor and the memory are integrated into a semiconductor chip. The processor is configured to: obtain a system image resident segment from an external storage; perform security verification on the system image resident segment; and migrate the security-verified system image resident segment to the memory. The system image resident segment resides in the memory when the processor runs the secure operating system. The memory is configured to provide the storage space for the processor to run a secure program. The secure program includes an image of the secure operating system. The image of the secure operating system includes the system image resident segment and a system image dynamic loading segment, the system image dynamic loading segment is divided into a plurality of pages, and each of the plurality of pages includes some content of the system image dynamic loading segment. The processor is further configured to: obtain the plurality of pages from the external storage; perform security verification on each of the plurality of pages; migrate each security-verified page to the memory; and run the secure program by using the storage space provided by the memory.

According to the technical solution provided in the third aspect, the processor of the secure element can perform security verification on the security-processed plurality of pages of the system image dynamic loading segment, to ensure that the dynamic loading part is run securely when the dynamic loading part is loaded from the external storage to the memory of the secure element.

With reference to the first aspect, the second aspect, or the third aspect, in a possible implementation, the security processing includes performing encryption and generating a message authentication code MAC. An encryption key for each page is associated with a virtual address of the page, and encryption keys for different pages are different. In this implementation, encryption and MAC generation are performed on each of the plurality of pages obtained by dividing the system image dynamic loading segment, to ensure privacy and validity of each page. In addition, because an encryption key for each page is associated with a virtual address of the page, it is ensured that the encryption keys for all the pages are different. This can ensure privacy more effectively; can further ensure that each key is traceable, to avoid an error caused by a key loss; and can further avoid an error caused by a data address confusion.

With reference to the first aspect, the second aspect, or the third aspect, in a possible implementation, the security processing further includes: encrypting a plurality of MACs for the plurality of pages as a whole; or encrypting a MAC for each of the plurality of pages, where encryption keys for different MACs are different. This implementation can ensure privacy of a MAC corresponding to each of the plurality of pages of the system image dynamic loading segment. In addition, when the MACs corresponding to the plurality of pages are encrypted as a whole, the MACs may be stored in the external storage for the secure element as a whole. Alternatively, when each page is separately encrypted by using an unused key, the pages may be separately stored in the external storage for the secure element.

With reference to the first aspect, the second aspect, or the third aspect, in a possible implementation, the secure element further includes a one-time programmable OTP; and an encryption key for each of the plurality of pages is associated with a count value of the OTP; and/or a MAC for each of the plurality of pages is associated with a count value of the OTP of the secure element. This implementation can prevent a network attacker from performing replacement by using a historical version of an encryption key for each page or a historical version of a MAC corresponding to each page, to prevent a rollback.

With reference to the first aspect, the second aspect, or the third aspect, in a possible implementation, the image of the secure operating system further includes a first signature for the system image resident segment, and a second signature for the system image resident segment, the first signature, and the system image dynamic loading segment. The processor is further configured to: verify the second signature, and after verification on the second signature succeeds, encrypt the system image resident segment and the first signature as a whole, and migrate content obtained by encrypting the system image resident segment and the first signature as a whole to the external storage for the secure element. In this implementation, a server side signs and encrypts the image of the secure operating system for a second time, to separately protect validity of the system image resident segment and the system image dynamic loading segment that are obtained through division on the server side, so that separate validity verification can be performed on the secure element. In this way, because the system image resident segment is signed one more time, security of the system image resident segment is better ensured. In addition, when loading and storing the system image resident segment for the first time, the secure element does not need to sign the system image resident segment again, thereby reducing a secure processing operation of the processor of the secure element.

With reference to the first aspect, the second aspect, or the third aspect, in a possible implementation, the processor is further configured to configure at least one page frame in the storage space provided by the memory. Each of the at least one page frame is used to store at least one of the plurality of pages, and a quantity of pages included in the at least one page frame is less than a quantity of pages included in the plurality of pages. In this implementation, a comparatively small virtual address space is reserved in the memory of the secure element, to reserve a flexible running space for the dynamic system image loading part of the secure operating system. This can not only reduce a space occupied in the memory when the secure operating system is run, but also flexibly load a page in the system image dynamic loading segment that needs to be run.

With reference to the first aspect, the second aspect, or the third aspect, in a possible implementation, the processor is further configured to configure the at least one page frame to allow read and write when the processor is in a privileged mode. In this implementation, because a function of the page frame is to perform page-based loading on the dynamic loading segment of the secure operating system, the page frame may be frequently read, written, and replaced, and consequently, a possibility of attacking the page frame by a network attacker is greatly increased. However, if an attribute of the page frame is configured to allow read and write only in a privileged mode, in the privileged mode, a possibility of attacking or reading and writing (stealing or tamping with) the page frame is greatly reduced due to attribute settings. Therefore, loading and running security of the system image dynamic loading segment can be further ensured.

With reference to the first aspect, the second aspect, or the third aspect, in a possible implementation, the processor is further configured to: when running the secure operating system, load the at least one security-processed page to the memory, and perform security verification on the at least one page. The security verification is an inverse operation of the security processing. In this implementation, when the processor of the secure element needs to read any one of the plurality of pages of the system image dynamic loading segment, the processor needs to read the page from the external storage, and perform security verification. Effective physical address mapping can be performed on only data corresponding to a page on which security verification succeeds. In this way, the processor can effectively read the data corresponding to the page.

With reference to the first aspect, the second aspect, or the third aspect, in a possible implementation, when the security processing includes encryption and MAC generation, the security verification includes decryption and MAC verification. In this implementation, when installing or upgrading the secure operating system, the secure element may perform page-based encryption on the system image dynamic loading segment and generate the MAC; and when any page in the system image dynamic loading segment is started, the secure element needs to perform corresponding decryption and MAC verification, to ensure security of the secure operating system that is loaded and run in the secure element.

With reference to the first aspect, the second aspect, or the third aspect, in a possible implementation, the secure program further includes a secure application program, and the secure application program includes an application program resident segment and an application program dynamic loading segment. The application program resident segment resides in the memory when the processor runs the secure application program. The processor is further configured to: divide the application program dynamic loading segment into a plurality of pages, where each of the plurality of pages includes some content of the application program dynamic loading segment; perform the security processing on each of the plurality of pages; and migrate each security-processed page to the external storage for the secure element. In this implementation, page security processing and page security verification on the dynamic loading segment of the secure operating system in any one of the first aspect or the implementations of the first aspect may also be applied to a secure application program that has a security requirement or that needs to be run in the secure element. To be specific, page security processing is performed on the resident segment and the dynamic loading segment in the dynamic loading segment that are obtained by dividing the secure application program. For related security processing, and an implementation and a beneficial effect of subsequent security verification, refer to related descriptions of any one of the first aspect or the implementations of the first aspect. Details are not described herein again.

With reference to the first aspect, the second aspect, or the third aspect, in a possible implementation, the secure program further includes a secure application program. The processor is further configured to: divide the secure application program into a plurality of pages, where each of the plurality of pages includes some content of the secure application program; perform the security processing on each of the plurality of pages; and migrate each security-processed page to the external storage for the secure element. In this implementation, page security processing and page security verification on the dynamic loading segment of the secure operating system in any one of the first aspect or the implementations of the first aspect may also be applied to a secure application program that has a security requirement or that needs to be run in the secure element. To be specific, the entire secure application program is divided into only the dynamic loading segment for security processing. For related security processing, and an implementation and a beneficial effect of subsequent security verification, refer to related descriptions of any one of the first aspect or the implementations of the first aspect. Details are not described herein again.

According to a fourth aspect, an embodiment of the present application provides a computing device. The computing device may include a processor and a memory. The memory is configured to provide a storage space for running of the processor. The processor is configured to: divide an image of a secure operating system into a system image resident segment and a system image dynamic loading segment; generate a first signature for the system image resident segment; and generate a second signature for the system image resident segment, the first signature, and the system image dynamic loading segment. The secure operating system is an operating system run by a secure element disposed in a terminal device.

According to the technical solution provided in the fourth aspect, the processor of the computer device can divide the image of the secure operating system, and perform two times of signature and encryption on the system image resident segment and dynamic image loading segment, to ensure security of the image of the secure operating system.

In a possible implementation, the processor is further configured to control the computing device to send the system image resident segment, the first signature, the system image dynamic loading segment, and the second signature to the terminal device. In this implementation, the computer device may securely transmit the image of the secure operating system to the terminal device side.

According to a fifth aspect, an embodiment of the present application provides a security processing method. The method may include: dividing, by a terminal device, a system image dynamic loading segment into a plurality of pages, where each of the plurality of pages includes some content of the system image dynamic loading segment, the system image dynamic loading segment is a partial image of a secure operating system included in a secure program, an image of the secure operating system includes the system image resident segment and the system image dynamic loading segment, and the system image resident segment resides in the memory in the secure element when a processor of the secure element of the terminal device runs the secure operating system; performing, by the terminal device, security processing on each of the plurality of pages; migrating, by the terminal device, each security-processed page to an external storage for the secure element; and when running the secure operating system, loading, by the terminal device, the at least one security-processed page to the memory, and performing security verification on the at least one page, where the security verification is an inverse operation of the security processing.

According to a sixth aspect, an embodiment of the present application provides a security processing method. The method may include: receiving, by a terminal device, a secure program sent by a server, where the terminal device includes a secure element, the secure element includes a processor and a memory, the processor and the memory are integrated into a semiconductor chip, the memory is configured to provide a storage space for the processor to load and run the secure program, the secure program includes an image of a secure operating system, and the image of the secure operating system includes a system image resident segment and a system image dynamic loading segment, where the system image resident segment resides in the memory when the processor runs the secure operating system; dividing, by the terminal device, the system image dynamic loading segment into a plurality of pages, where each of the plurality of pages includes some content of the system image dynamic loading segment; performing, by the terminal device, security processing on each of the plurality of pages; migrating, by the terminal device, each security-processed page to an external storage for the secure element; and when running the secure operating system, loading, by the terminal device, the at least one security-processed page to the memory, and performing security verification on the at least one page, where the security verification is an inverse operation of the security processing.

According to a seventh aspect, an embodiment of the present application provides a security processing method. The method may include: receiving, by a terminal device, a secure program sent by a server, where the terminal device includes a secure element, the secure element includes a processor and a memory, the processor and the memory are integrated into a semiconductor chip, the memory is configured to provide a storage space for the processor to load and run the secure program, the secure program includes an image of a secure operating system, and the image of the secure operating system includes a system image resident segment and a system image dynamic loading segment, where the system image resident segment resides in the memory when the processor runs the secure operating system; dividing, by the terminal device, the system image dynamic loading segment into a plurality of pages by using the processor, where each of the plurality of pages includes some content of the system image dynamic loading segment; performing, by the terminal device, security processing on each of the plurality of pages by using the processor; migrating, by the terminal device, each security-processed page to an external storage for the secure element by using the processor; and when running the secure operating system, loading, by the terminal device, the at least one security-processed page to the memory by using the processor, and performing security verification on the at least one page by using the processor, where the security verification is an inverse operation of the security processing.

According to the technical solution provided in the seventh aspect, the processor of the secure element of the terminal device can divide a dynamic loading part of the secure operating system into a plurality of pages, perform security processing on each of the plurality of pages, and then store each security-processed page into the external storage for the secure element, so as to ensure that the dynamic loading part is run securely on the terminal device.

With reference to the fifth aspect, the sixth aspect, or the seventh aspect, in a possible implementation, the security processing includes performing encryption and generating a message authentication code MAC. An encryption key for each page is associated with a virtual address of the page, and encryption keys for different pages are different.

With reference to the fifth aspect, the sixth aspect, or the seventh aspect, in a possible implementation, the security processing further includes: encrypting a plurality of MACs for the plurality of pages as a whole; or encrypting a MAC for each of the plurality of pages, where encryption keys for different MACs are different.

With reference to the fifth aspect, the sixth aspect, or the seventh aspect, in a possible implementation, the secure element further includes a one-time programmable OTP; and an encryption key for each of the plurality of pages is associated with a count value of the OTP; and/or a MAC for each of the plurality of pages is associated with a count value of the OTP of the secure element.

With reference to the fifth aspect, the sixth aspect, or the seventh aspect, in a possible implementation, the image of the secure operating system further includes a first signature for the system image resident segment, and a second signature for the system image resident segment, the first signature, and the system image dynamic loading segment. The method further includes: verifying, by the terminal device, the second signature; and after verification on the second signature succeeds, encrypting the system image resident segment and the first signature as a whole, and migrating content obtained by encrypting the system image resident segment and the first signature as a whole to the external storage for the secure element.

With reference to the fifth aspect, the sixth aspect, or the seventh aspect, in a possible implementation, the method further includes: configuring, by the terminal device, at least one page frame in the storage space provided by the memory, where each of the at least one page frame is used to store at least one of the plurality of pages, and a quantity of pages included in the at least one page frame is less than a quantity of pages included in the plurality of pages.

With reference to the fifth aspect, the sixth aspect, or the seventh aspect, in a possible implementation, the method further includes: configuring, by the terminal device, the at least one page frame to allow read and write when the processor is in a privileged mode.

With reference to the fifth aspect, the sixth aspect, or the seventh aspect, in a possible implementation, the method further includes: when running the secure operating system, loading the at least one security-processed page to the memory, and performing security verification on the at least one page. The security verification is an inverse operation of the security processing.

With reference to the fifth aspect, the sixth aspect, or the seventh aspect, in a possible implementation, when the security processing includes encryption and MAC generation, the security verification includes decryption and MAC verification.

With reference to the fifth aspect, the sixth aspect, or the seventh aspect, in a possible implementation, the secure program further includes a secure application program, and the secure application program includes an application program resident segment and an application program dynamic loading segment. The application program resident segment resides in the memory when the processor runs the secure application program.

The method further includes: dividing, by the terminal device, the application program dynamic loading segment into a plurality of pages, where each of the plurality of pages includes some content of the application program dynamic loading segment; performing the security processing on each of the plurality of pages; and migrating each security-processed page to the external storage for the secure element.

With reference to the fifth aspect, the sixth aspect, or the seventh aspect, in a possible implementation, the secure program further includes a secure application program. The method further includes: dividing, by the terminal device, the secure application program into a plurality of pages, where each of the plurality of pages includes some content of the secure application program; performing the security processing on each of the plurality of pages; and migrating each security-processed page to the external storage for the secure element.

According to an eighth aspect, this application provides a semiconductor chip. The semiconductor chip may include: the secure element provided in any one of the first aspect, the second aspect, the third aspect, and the implementations of the foregoing three aspects, and a central processing unit that is coupled to the secure element and an external storage for the secure element.

According to a ninth aspect, this application provides a semiconductor chip. The semiconductor chip may include: the secure element provided in any one of the first aspect, the second aspect, the third aspect, and the implementations of the foregoing three aspects.

According to a tenth aspect, this application provides a system on chip SoC chip. The SoC chip includes the secure element provided in any one of the first aspect, the second aspect, the third aspect, and the implementations of the foregoing three aspects, and a central processing unit that is coupled to the secure element and an external storage for the secure element. The chip system may include a chip, or may include a chip and another discrete device.

According to an eleventh aspect, this application provides a chip system. The chip system includes the chip including the secure element provided in any one of the first aspect, the second aspect, the third aspect, and the implementations of the foregoing three aspects, and a second chip including a central processing unit that is coupled to the secure element and an external storage for the secure element. The chip system may include a chip, or may include a chip and another discrete device.

According to a twelfth aspect, this application provides a chip system. The chip system includes the secure element provided in any one of the first aspect, the second aspect, the third aspect, and the implementations of the foregoing three aspects, a third chip coupled to the central processing unit of the secure element, and a fourth chip including the external storage for the secure element. The chip system may include a chip, or may include a chip and another discrete device.

According to a thirteenth aspect, this application provides a terminal device. The terminal device includes a secure element, a central processing unit coupled to the secure element, and an external storage for the secure element. The secure element includes a processor and a memory, and the processor and the memory are integrated into a semiconductor chip. The memory is configured to provide a storage space for the processor to load and run a secure program. The secure program includes an image of a secure operating system. The image of the secure operating system includes a system image resident segment and a system image dynamic loading segment. The system image resident segment resides in the memory when the processor runs the secure operating system. The processor is configured to: divide the system image dynamic loading segment into a plurality of pages, where each of the plurality of pages includes some content of the system image dynamic loading segment; perform security processing on each of the plurality of pages; and migrate each security-processed page to an external storage for the secure element.

According to a fourteenth aspect, this application provides a terminal device. The terminal device includes a secure element, a central processing unit coupled to the secure element, and an external storage for the secure element. The secure element may include a processor and a memory. The processor and the memory are integrated into a semiconductor chip. The memory is configured to provide a storage space for the processor to load and run a secure program. The secure program includes an image of a secure operating system. The image of the secure operating system includes a system image resident segment and a system image dynamic loading segment. The system image resident segment resides in the memory when the processor runs the secure operating system. The system image dynamic loading segment is divided into a plurality of pages, and security processing has been performed on content on each of the plurality of pages. The processor is configured to: when running the secure operating system, load at least one of the plurality of pages to the memory, and perform security verification on the at least one page. The security verification is an inverse operation of the security processing.

According to a fifteenth aspect, this application provides a terminal device. The terminal device includes the secure element provided in any one of the first aspect, the second aspect, the third aspect, and the implementations of the foregoing three aspects, and the external storage for the secure element. The secure element and the external storage for the secure element are disposed in different semiconductor chips.

According to a sixteenth aspect, this application provides a terminal device. The terminal device includes the secure element provided in any one of the first aspect, the second aspect, the third aspect, and the implementations of the foregoing three aspects, the external storage for the secure element, and a central processing unit coupled to the secure element. The external storage is configured to store a secure program and another necessary program instruction and data. The central processing unit is configured to run a general-purpose operating system necessary for the terminal device, and is configured to be coupled to the secure element to install and run the secure operating system in the secure element. The terminal device may further include a communications interface. The communications interface is used by the terminal device to communicate with another device or a communications network.

According to a seventeenth aspect, this application provides a computer storage medium, configured to store a computer software instruction used by the terminal device provided in the thirteenth aspect to the sixteenth aspect. The computer software instruction includes a program designed for performing the foregoing aspects.

According to an eighteenth aspect, an embodiment of the present application provides a computer program. The computer program includes an instruction. When the computer program is executed by a computer, the computer is enabled to perform the procedure performed by the processor and the memory in the secure element provided in any one of the first aspect, the second aspect, the third aspect, and the implementations of the foregoing three aspects, or perform the procedure of the security processing method provided in any one of the fifth aspect to the seventh aspect and the implementations of the fifth aspect to the seventh aspect.

DETAILED DESCRIPTION OF ILLUSTRATIVE EMBODIMENTS

Figure 1:
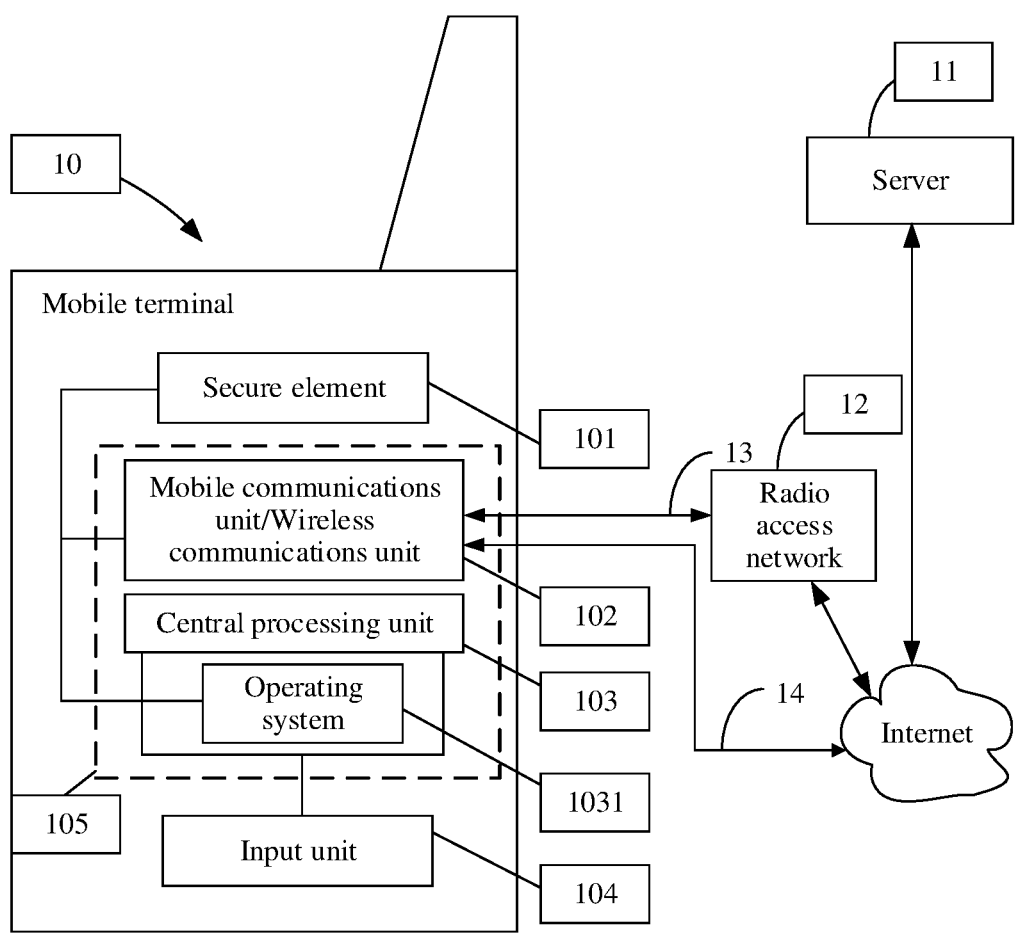
FIG. 1 is an architectural diagram of a system for installing and upgrading a secure program according to an embodiment of the present application.

The following describes the embodiments of the present application with reference to the accompanying drawings in the embodiments of the present application.

In the specification, claims, and accompanying drawings of this application, terms such as "first", "second", "third", and "fourth" are intended to distinguish between different objects but do not indicate a particular order. In addition, terms "including", "having", and any other variant thereof, are intended to cover a non-exclusive inclusion. For example, a process, a method, a system, a product, or a device including a series of steps or units is not limited to the listed steps or units, but optionally further includes an unlisted step or unit, or optionally further includes another step or unit inherent in the process, the method, the product, or the device.

The "embodiment" in this specification means that a particular characteristic, structure, or feature described with reference to the embodiment may be included in at least one embodiment of this application. The phrase shown in various locations in the specification may not necessarily refer to a same embodiment, and is not an independent or optional embodiment exclusive from another embodiment. It is explicitly and implicitly understood by a person skilled in the art that the embodiments described in this specification may be combined with another embodiment.

Terms such as "component", "module", and "system" used in this specification are used to indicate a computer-related entity, hardware, firmware, a combination of hardware and software, software, or software that is being executed. For example, the component may be, but is not limited to, a process that is run on a processor, a processor, an object, an executable file, a thread of execution, a program, and/or a computer. As shown in figures, both a computing device and an application that is run on a computing device may be components. One or more components may reside in a process and/or a thread of execution, and the components may be located on one computer and/or distributed between two or more computers. In addition, these components may be executed from various computer-readable media that store various data structures. For example, the components may communicate with each other, for example, by using a local and/or remote process based on a signal having one or more data packets (for example, data from two components that interact with another component in a local system, a distributed system, and/or a network, for example, an internet that interacts with another system by using a signal).

Some terms in this application are first described, to help a person skilled in the art have a better understanding.

(1) System on chip (SoC): The SoC is referred to as a system-level chip, and also referred to as a system on chip. This means that the SoC is a product, is an integrated circuit with a dedicated target, and includes a complete system and all content of embedded software. In addition, the SoC is also a technology that is used to implement an entire process of determining system function, dividing software/hardware, and completing a design.

(2) Random access memory (RAM): is equivalent to a mobile storage of a PC, and is configured to store and save data. The RAM can be read and written at any time. The RAM is usually used as an operating system or another temporary storage medium (which is also referred to as a system memory) that is running a program.

(3) Memory management unit (MMU): is a control line that is in a central processing unit (CPU) and that is configured to manage a virtual memory and a physical memory, and is also responsible for mapping a virtual address to a physical address and providing a multi-user multi-process operating system and memory access authorization of a hardware mechanism. (4) Double data rate synchronous dynamic random access memory (DDR SDRAM): is DDR for short. The DDR in this application is a memory distributed on a semiconductor different from a semiconductor on which a secure element is distributed, a processor of the secure element in this application cannot directly read data stored in the DDR, but accesses the data with assistance of a subsystem such as an external component IPC & RAM or a central processing unit CPU.

(5) Paging technology: A paging technology is most commonly used in a virtual memory management technology, and an MMU is hardware implementation of the technology. A virtual address space is divided into pages, and a corresponding physical address space is also divided into page frames. Sizes of the page and the page frame need to be the same, and mapping between a page and a page frame is performed through scheduling of the MMU.

(6) Physical address: is an address sent by a CPU by using an address bus. A meaning of the physical address is controlled by a hardware circuit. After segment mapping and page mapping are performed on a virtual address in a program instruction, a physical address is generated. The physical address is placed on an address line of the CPU.

(7) Physical address space: A part of the physical address space is used by the physical RAM (memory), and a part of the physical address space is used by the bus. This is determined by a hardware design. In this case, in an x86 processor with a 32-bit address line, the physical address space is the 32th power of 2, that is, 4 GB. However, the physical RAM cannot reach 4 GB because a part of the RAM is used for the bus (many other devices are connected to the bus). In a PC, a low-end physical address is usually used by the RAM, and a high-end physical address is used by the bus.

(8) Memory management unit (MMU): is a control line that is in a central processing unit (CPU) and that is configured to manage a virtual memory and a physical memory; and is also responsible for mapping a virtual address to a physical address and providing a multi-user multi-process operating system and memory access authorization of a hardware mechanism. The processor of the secure element in this application includes the MMU.

(9) Message authentication code (MAC): The MAC is an authentication mechanism used by both communication entities, and is a tool for ensuring message data integrity. The MAC is similar to a digest algorithm. However, a key further needs to be used the MAC is calculated. Therefore, the MAC is a value obtained based on the key and a message digest. Actually, the MAC is redundant information generated for the message, and can be used for data source authentication and integrity verification.

(10) Image file of an operating system: is a file obtained by cloning all data of the operating system. Generally, the image file of the operating system has a file suffix ".ISO", and can be edited by using software such as ULtraISO or PowerISO. The image file of the operating system includes a system file, a boot file, partition table information, and the like. In this case, the image file of the operating system may include all information of a partition or even a hard disk.

(11) Asymmetric encryption: An asymmetric encryption algorithm requires two keys: a public key and a private key, which are referred to as a public key and a private key. The public key and the private key are one pair. If the public key is used to encrypt data, decryption can be performed only by using the corresponding private key. If the private key is used to encrypt data, decryption can be performed only by using the corresponding public key. This algorithm is referred to as an asymmetric encryption algorithm because two different keys are used for encryption and decryption. A basic process of exchanging confidential information by using the asymmetric encryption algorithm is as follows: Party A generates a pair of keys and discloses one of the keys as a public key to another party. Party B that obtains the public key encrypts the confidential information by using the key and then sends encrypted confidential information to Party A. Party A decrypts the encrypted information by using another dedicated private key stored by Party A.

(12). Symmetric encryption: is also referred to as symmetric key encryption or dedicated key encryption. To be specific, both a data sender and a data receiver needs to perform encryption and decryption operations on a plaintext by using a same key. That is, an encryption key can be deduced from a decryption key, and vice versa. In most symmetric algorithms, an encryption key is the same as a decryption key. These algorithms are also referred to as secret-key algorithms or single-key algorithms, and the algorithms require a sender and a receiver to agree on a key before secure communication. Security of the symmetric algorithms depends on the key. If the key is leaked, anyone can encrypt and decrypt messages. The key needs to keep confidential provided that communication requires confidentiality.

(13) Digital signature is referred to as signature. A digital signature technology is to encrypt digest information by using a private key of a sender and send encrypted digest information together with an original text to a receiver. The receiver can decrypt the encrypted digest information only by using a public key of the sender. Then, the receiver generates digest information for the received original text by using a Hash function and compares the digest information with decrypted digest information. If the digest information and the decrypted digest information are the same, it indicates that the received information is complete and is not modified in a transmission process; otherwise, it indicates that the information is modified. Therefore, digital signature can verify integrity of the information. Digital signature is an encryption process, and digital-signature verification is a decryption process.

From the foregoing descriptions of the symmetric-key algorithm and the asymmetric-key algorithm, it can be learned that a same key is used for symmetric key encryption and decryption, or a decryption key can be easily derived from an encryption key. The symmetric-key algorithm is characterized by simple encryption processing, fast encryption and decryption, a short key, a long development history, and the like. The asymmetric-key algorithm is characterized by slow encryption and decryption, a large key size, a short development history, and the like.

For ease of understanding the embodiments of the present application, the embodiments of the present application provide a system architecture for description. FIG. 1 is an architectural diagram of a system for installing and upgrading a secure program according to an embodiment of the present application. Referring to FIG. 1, the system architecture may include a terminal device 10 and a server 11. The terminal device 10 obtains a secure program by using the server 11, to install, run, or upgrade the secure program. The terminal device 10 may include a secure element 101, and optionally, may further include a mobile communications unit/wireless communications unit 102 and a central processing unit 103. Optionally, as shown in FIG. 1, the secure element 101, the central processing unit 103, and the mobile communications unit/wireless communications unit 102 may be located on a substrate of an integrated circuit, that is, becoming a master chip 105. The secure element 101 specifically communicates with the central processing unit 103 on the master chip 105 through a serial peripheral interface (SPI).

The secure element 101, namely, the secure element in this application, may be a component coupled to the independent central processing unit (CPU) 103; and is configured to: implement various functions related to running of a security service, for example, running a secure program (including a secure operating system and a secure application program), and store data such as a key and a certificate that are related to running of the secure program.

The mobile communications unit/wireless communications unit 102 is configured for the central processing unit 103 to: obtain a secure program from the server 11 by using a radio access network (RAN) 12 and a mobile communications network, or obtain a secure program from the server by using a wireless network 14. The internet is connected to the server 11 in the Internet. In this case, the mobile communications unit 102 may be a unit that runs a wireless cellular communications protocol, and is configured to connect the mobile terminal device 10 to the internet by using a wireless cellular communications link 13. Alternatively, the wireless communications unit 102 is a unit that runs a wireless network communications protocol, and is configured to connect the mobile terminal device 10 to the internet by using a wireless network communications link 14. The mobile communications unit 102 may specifically run a wireless cellular communications protocol such as a global system for mobile communications (GSM), a universal mobile telecommunications system (UMTS), worldwide interoperability for microwave access (WiMAX), or long term evolution (LTE), to implement a mobile internet function of the mobile terminal device 10. Alternatively, the wireless communications unit 102 may specifically run a Bluetooth communication protocol, an infrared communication protocol, and a wireless fidelity (WiFi) protocol to implement a wireless internet function of the mobile terminal device 10.

The central processing unit 103 is configured to obtain the secure program from a side of the server 11, and runs operating system software 1031, for example, system software such as Android and iOS. The central processing unit 103 is configured to be coupled to and cooperate with the secure element 101 to perform a related secure service, for example, controlling to enable or disable the secure element 10 or transmitting the secure program to the secure element for installation, running, or upgrade.

In addition, the terminal device 10 may further include an input unit 104. The input unit 104 may be a touchscreen, and is configured to exchange a message with a user by using a user interface (User Interface, UI), so that the user may enter an operation instruction on the input unit 104 by using the UI, to instruct the operating system software 1031 and related application software to perform a related operation, such as downloading, update, or upgrade of a secure operating system/secure application.

The server 11 may be configured to perform security processing on an image of the secure operating system including a system image resident segment and a system image dynamic loading segment, or on a secure application program including an application program resident segment and an application program dynamic loading segment, and store the security-processed image or secure application program.

Figure 2:
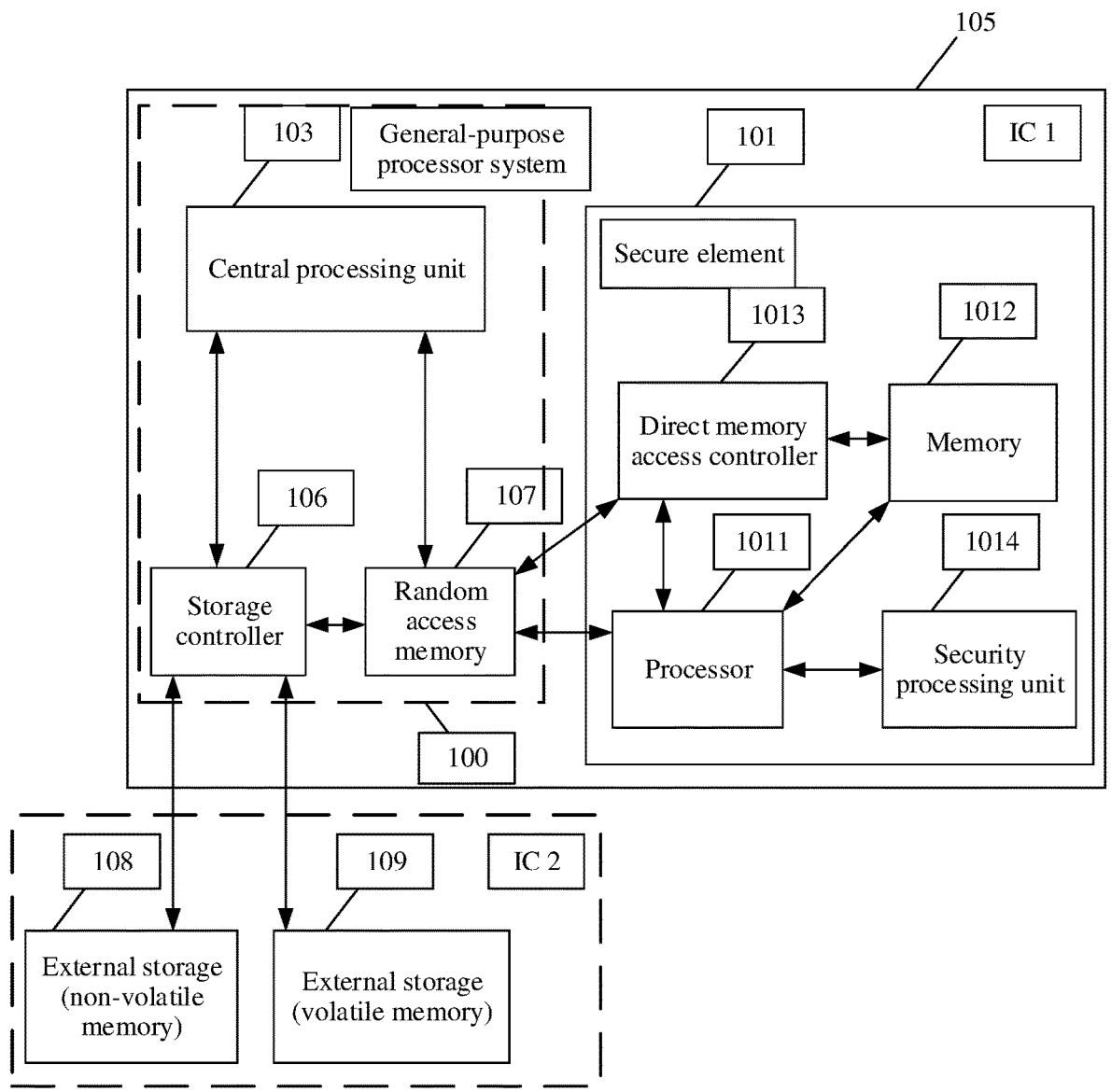
FIG. 2 is a schematic structural diagram of a simplified terminal device including a secure element and a central processing unit according to an embodiment of the present application.

As a refinement of some content in FIG. 1, FIG. 2 is a schematic structural diagram of a simplified terminal device including a secure element and a central processing unit according to an embodiment of the present application. The secure element and the central processing unit may be located in one terminal device 10. The terminal device 10 may be user equipment (UE), for example, any type of portable terminal device such as a mobile phone or a tablet computer. The terminal device 10 includes a first semiconductor chip IC 1 and a second semiconductor chip IC 2. The first semiconductor chip IC 1 includes a secure element 101 and one or more general-purpose central processing units 103 coupled to the secure element 101. The secure element 101 includes a processor 1011 and a memory 1012, and optionally further includes a DMA (direct memory access) controller 1013 and a security processing unit 1014.

The processor 1011 is configured to: install or run secure operating system software and a secure application program that is based on the secure operating system software, and perform security processing and security verification on a secure operating system.

The memory 1012 is configured to temporarily store secure temporary data generated when the secure operating system software and the secure application program are run; and may be understood as a RAM in the secure element, to be specific, the memory 1012 provides, for the processor 1011, a memory space required for running the secure operating system or the secure application program. The memory 1012 may be a volatile memory (Random Access Memory, RAM).

Optionally, as shown in FIG. 2, the secure element 101 further includes a DMA (direct memory access) controller 1013, configured to control data migration between the memory 1012 and an external storage 108/109. The DMA controller 1013 is a component independent of the processor 1011, and is exclusively configured to migrate temporary data in the secure element 101 to another external device or interface. The processor 1011 does not need to be responsible for a corresponding data migration function. In this case, the processor 1011 only needs to run and process a secure program, and the DMA controller 1013 migrates data. Further, the secure element 101 may further include the security processing unit 1014 that has a security function of performing security operation processing such as encryption/decryption, MAC generation, and MAC verification. A difference from the foregoing implementation in which the processor 1011 directly performs security processing and security verification lies in that the security processing unit 1014 in this implementation is a unit independent of the processor 1011, and is dedicated to security operations such as encryption/decryption, MAC generation, and MAC verification, so that performance is better. Optionally, the processor 1011, the DMA controller 1013, and the security processing unit 1014 in the secure element 101 may be considered as a whole, that is, the processor 1011 having processing and operation functions, and the memory 1012 is used as a memory of the processor.

The central processing unit 103 may be, for example, an ARM processor configured to run general-purpose operating system software, for example, an Android system, and is driven by the general-purpose operating system software to communicate with the secure element lot 101. Further, referring to FIG. 2, the first semiconductor chip IC 1 may further include a storage controller 106 and a random access memory 107. The central processing unit 103, the random access memory 107, and the storage controller 106 may be included in a general-purpose processor system 100. The general-purpose processor system 100 can be run based on general-purpose operating system software and common application software, and may selectively work in a TEE environment. Because the general-purpose processor system 100 cannot directly access or directly read data in the secure element 101, the general-purpose processor system 100 exchanges data with the secure element 101 by using the random access memory 107, and conforms to an IPC protocol.

Further referring to FIG. 2, a related storage device is located in the second semiconductor chip IC 2, and the storage device may store a general-purpose operating system run by the at least one central processing unit 103, a secure operating system run by the secure element 101, or intermediate data or temporary data generated when the operating system is run. Therefore, an external storage device may be an external storage 108 (an external non-volatile memory NVM), for example, may be a replay protected memory block (RPMB) memory. Further, the storage device may further include an external storage 109 (a volatile storage device), may be an external DDR, for example, a random access memory such as an SRAM (static random access memory), a DRAM (dynamic random access memory), or an SDRAM (synchronous dynamic random access memory), and preferably, is a DDR SDRAM.

It should be noted that, when the memory 1012 in the secure element 101 exchanges related secure data with the external storage 108/109 disposed on the second semiconductor chip IC 2, for example, the system image resident segment and the system image dynamic loading segment of the secure operating system and the like described in this embodiment of the present application are migrated, the data migration needs to pass through the random access memory 107. Specifically, the processor 1011 or the DMA controller 1013 is configured to read data of a secure program from the memory 1012 and write the data into the random access memory 107. The storage controller 106 may be a DMA controller. The DMA controller may be configured to write temporary data of the random access memory 107 into the external storage 108/109 in a TEE environment, to migrate the temporary data from the secure element 101 to the external storage 108/109. After being migrated, the temporary data may be deleted from the memory 1012 by the processor 1011, the DMA controller 1013, or the storage controller 106. Alternatively, the central processing unit 103 may replace the storage controller 106 to implement a function of writing related data into a secure storage area of the external storage 108/109. Therefore, that the processor 1011 or the DMA controller 1013 in this embodiment of the present application migrates data to the external storage 108/109 not only includes directly migrating the data to the external storage 108/109, but also includes performing control by using an interrupt instruction or an IPC protocol instruction, to implement bidirectional data migration between the memory 1012 and the external storage 108/109 by using a third-party random access memory.

Optionally, in FIG. 2, the random access memory 107 is located in the general-purpose processor system loft Actually, the random access memory 107 may alternatively be located in the secure element lot A location of the random access memory 107 is not limited in this embodiment.

It should be further noted that, in this application, security isolation exists between the secure element 101 and the general-purpose operating system software that is run by the general-purpose central processing unit 103. In this disclosure, the security isolation means limiting access to the secure element lot Therefore, the security isolation may be understood as a means of controlling permission of access between systems. That security isolation exists between the secure element 101 and the general-purpose operating system software that is run by the general-purpose central processing unit 103 means limiting access, to the secure element 101 or the memory 1012 in the secure element 101, of the general-purpose operating system software that is run by the general-purpose central processing unit 103 or common application software that is based on the general-purpose operating system software. In other words, due to impact of the security isolation, the general-purpose operating system software or the common application software cannot access the secure element 101 or the memory 1012. If there are a plurality of pieces of common application software based on the general-purpose operating system software, access of at least some of the pieces of common application software to the secure element 101 is limited. For example, the general-purpose operating system software that is run by the general-purpose central processing unit 103 or at least one piece of common application software based on the general-purpose operating system software can neither read or change data that is being executed by the secure element 101 or data temporarily stored in the memory 1012, nor write data into the memory 1012, to achieve security.

It may be understood that the system architecture specifically used in this embodiment of the present application includes but is not limited to an installation and upgrade system architecture based on the secure program in FIG. 1, provided that any architecture in which the secure element in this application can be used to perform related processing of the secure program falls within the protection scope and coverage of this application.

The following further describes functions of the processor 1011 and the memory 1012 in the secure element 101 with reference to the structures of the terminal device and the secure element that are corresponding to FIG. 1 and FIG. 2. It may be understood that, based on the structure of the secure element 101 in FIG. 2, some functions performed or completed by the processor ion or the memory 1012 may alternatively be completed by the direct memory access controller 1013 or the security processing unit 1014 in the secure element 1013. Details are not described subsequently.

In this application, the secure operating system that needs to be loaded and run by the secure element is a secure operating system provided by a computing device (for example, a service provider device, such as a server or a cloud server, that provides a secure operating system for a secure element of a mobile phone) for a terminal device on which no secure operating system is installed. In addition, in a subsequent use process of the terminal device, for operations such as upgrade and update of the secure operating system (that is, first installation or system upgrade), the server needs to provide a corresponding secure operating system.

Figure 3A:
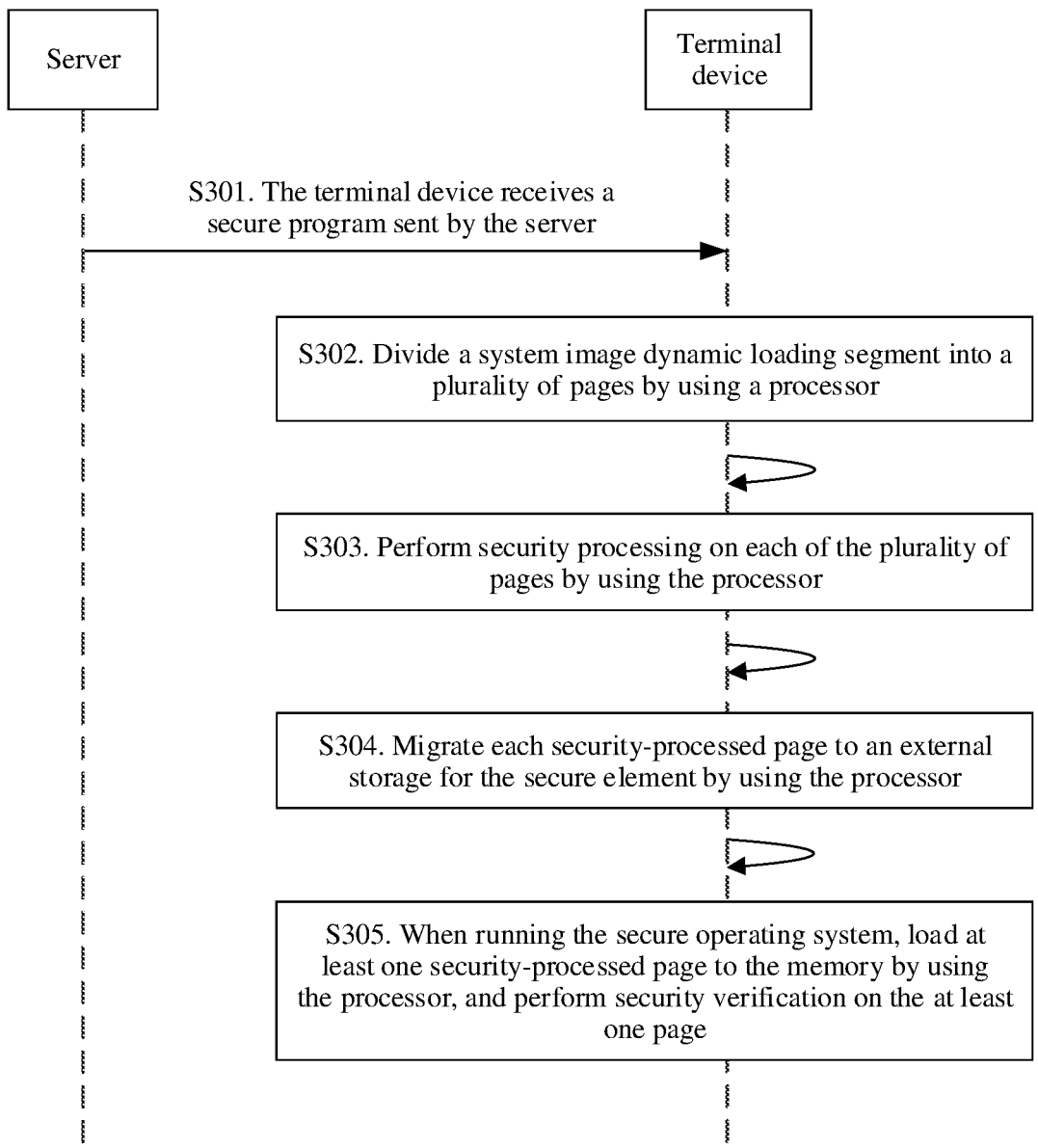
FIG. 3*a* is a schematic flowchart of a security processing method according to an embodiment of the present application.

For ease of description, this embodiment provides a flowchart of a security processing method shown in FIG. 3a. In a related procedure, a secure program is transmitted between a server and a terminal device, and then the terminal device performs security processing on the received secure program by using a processor of an internal secure element. Brief steps of the security processing procedure may include the following.

S301. The terminal device receives the secure program sent by the server.

The terminal device includes the secure element, the secure element includes the processor and a memory, the processor and the memory are integrated into a semiconductor chip, the memory is configured to provide a storage space for the processor to load and run the secure program, the secure program includes an image of a secure operating system, and the image of the secure operating system includes a system image resident segment and a system image dynamic loading segment. The system image resident segment resides in the memory when the processor runs the secure operating system.

S302. The terminal device divides the system image dynamic loading segment into a plurality of pages by using the processor, where each of the plurality of pages includes some content of the system image dynamic loading segment.

S303. The terminal device performs security processing on each of the plurality of pages by using the processor.

S304. The terminal device migrates each security-processed page to an external storage for the secure element by using the processor.

S305. When running the secure operating system, the terminal device loads the at least one security-processed page to the memory by using the processor, and performs security verification on the at least one page, where the security verification is an inverse operation of the security processing.

Based on the foregoing method procedure, the following describes functions that are corresponding to execution bodies: the terminal device (the secure element) and the server in the foregoing method procedure. It should be noted that a computer device provided in this application may be the foregoing server.

In this application, the server (one type of computer device in this application) may include a processor and a memory. The memory is configured to provide a storage space for running of the processor. The processor is configured to: divide an image of a secure operating system into a system image resident segment and a system image dynamic loading segment; generate a first signature for the system image resident segment; and generate a second signature for the system image resident segment, the first signature, and the system image dynamic loading segment. The secure operating system is an operating system run by the secure element disposed in the terminal device.

In a possible implementation, the processor is further configured to control the computing device to send the system image resident segment, the first signature, the system image dynamic loading segment, and the second signature to the terminal device.

For example, in this application, the server may separately divide an RO data segment and a text segment in an image file of the secure operating system into a system image resident segment and a system image dynamic loading segment; and a data segment is not divided, that is, only the system image resident segments are subsequently directly loaded to a RAM of the secure element, and corresponding partial data in the system image dynamic loading segments is loaded to the RAM of the secure element only when a corresponding function needs to be performed. A specific division standard may be based on a function in the operating system. For example, a code and data that are corresponding to functions that are mandatory after the system is started are in resident segments, and a function that may be used is in a system image dynamic loading segment. This not only reduces a RAM size occupied by an OS in a loading process, but also can place, as the image becomes larger, an added function part in the system image dynamic loading segment as much as possible; in this way, a resident part can remain unchanged, so that a size of the system image area in the RAM tends to be fixed.

Figure 3B:
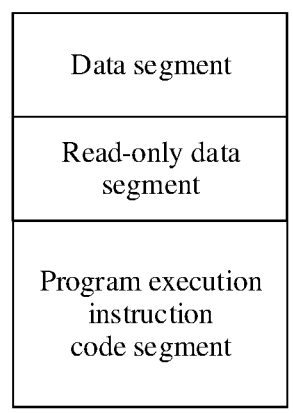
FIG. 3*b* is a schematic structural diagram of a common image according to an embodiment of the present application.

The following describes a reason that only the RO data segment and the text segment in the image file are separately divided into a resident segment and a dynamic loading segment. In the current system, an executable program includes a block started by symbol segment (BSS segment), a data segment, and a code segment (which is also referred to as a text segment). Therefore, a common image mainly includes a data segment, a read-only data segment, and a program execution instruction segment. FIG. 3b is a schematic structural diagram of a common image according to an embodiment of the present application.

(1) Data segment: includes a read-write data segment (RW Data segment) and a BSS segment.

RW Data is also referred to as initialized data. The RW data segment represents a data area in which read and write can be performed, and is usually used to store an initialized global variable and an initialized local static variable. In addition, the RW Data segment occupies a quite small space.

BSS is also referred to as uninitialized data. The BSS segment is a memory area used to store an uninitialized global variable and an uninitialized static variable in a program. The BSS segment is readable and writable, and is automatically cleared before the program is executed. In addition, the BSS segment occupies a quite small space.

For example, static char b[100]={"ABCDEFG"} is defined in a function. A characteristic of the data read/write area is that the data read/write area needs to be initialized in a program. If there is only a definition and no initial value, the data read/write area is not generated, and an uninitialized data area (BSS) is defined instead.

(2) Read-only data segment (RO Data segment): A characteristic of the RO Data segment is that the RO data segment does not need to be changed during running. The RO data segment includes a read-only global variable and a read-only local variable, and a constant or the like used in a program is usually placed in a read-only data area during compilation.

(3) Program execution instruction segment: is referred to as code segment (Text/Code segment), the code segment is generated by each function, and each statement of the function is finally compiled and assembled to generate binary machine code (generated machine code of a specific architectural structure is determined by a compiler). The code segment occupies a quite large space, can only be read, cannot be changed, and usually includes some string constants.

The foregoing is content included in the common image file. Based on the foregoing, because the entire data segment occupies a comparatively small space and is a readable and writable area, corresponding data may change in a program running process. Therefore, this part is not further divided into a system image resident segment or a system image dynamic loading segment in this application, but is directly read to the RAM after being loaded, to avoid low running efficiency caused by frequent I/O reading. Because both the RO data segment and the text segment are read-only, and the RO data segment and the text segment occupy comparatively large spaces, the parts are separately divided into a system image resident segment and a system image dynamic loading segment. Certainly, it may be understood that a dynamic loading method in this application may alternatively be used for the foregoing data segment. For a specific implementation, refer to related descriptions of a dynamic system image loading manner. Details are not described herein again.

In conclusion, in this application, after an operating system image (OS image) is initialized, an operating system image (OS image) area occupied in the RAM may include the data segment, the system image dynamic loading segment of the RO data, the system image resident segment of the RO data, the system image dynamic loading segment of the text, and the system image resident segment of the text. Specifically, the data segment, the system image resident segment of the RO data, and the system image resident segment of the text may be fixedly mapped to physical memory after the OS is started, and occupy an actual physical space. For example, a function for handling an exception interrupt of an address needs to reside in a memory area, and a hotspot function and a hotspot read-only data segment also need to reside in the memory area, so as to avoid affecting real-time performance because data needs to be continually loaded from outside when a function having a high performance requirement is executed. For another example, in the OS, there are usually some main modules (or components) of a kernel, for example, storage management, process management, a file system, device management and drive, network communication, system initialization (boot), and a system call. All of these main modules (or components) can be used as the system image resident segment in the system image file.

The system image dynamic loading segment of the RO data and the system image dynamic loading segment of the text may not be loaded to the memory during initialization, that is, may not be loaded to the physical space. For example, the system image dynamic loading segment in the operating system image file may include a corresponding system program or corresponding system data for managing a microphone, a camera, audio, a calculator, Bluetooth, or the like. The processor loads the system image dynamic loading segment of the RO data and/or the system image dynamic loading segment of the text from the external storage to the RAM of the secure element only when the processor needs to execute the corresponding system image dynamic loading segment of the RO data and/or the corresponding system image dynamic loading segment of the text. It can be understood that, in this case, a fixed quantity of pages (where the quantity of pages is fixed and comparatively small) need to be reserved in advance in the RAM of the secure element for these dynamically loaded RO data segments and/or text segments, that is, only the fixed quantity of page spaces are reserved in the RAM.

Figure 4:
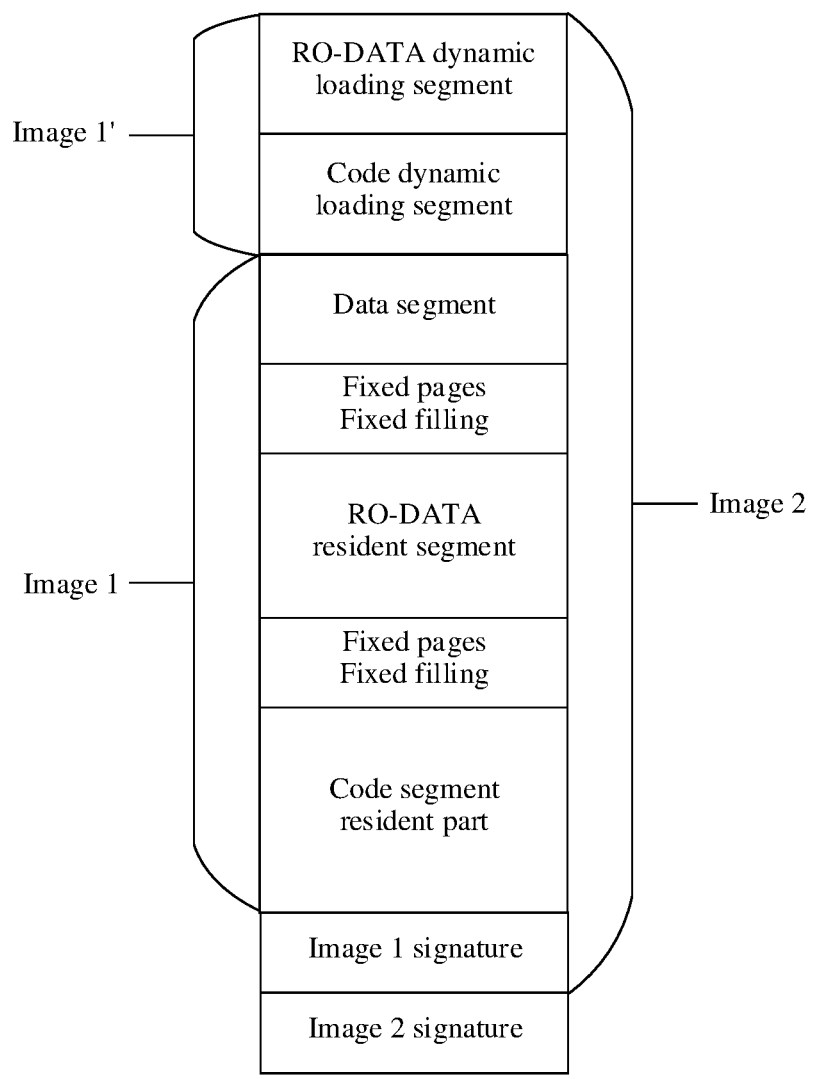
FIG. 4 is a schematic diagram of two times of system image signature according to an embodiment of the present application.

Further, after dividing the image of the secure operating system into the system image resident segment and the system image dynamic loading segment, the server side further needs to perform security processing on the image of the secure operating system, that is, ensure security of a source of the secure operating system. The server can perform and complete the following functions when creating the image of the secure operating system:

Optionally, the image of the secure operating system further includes a first signature for the system image resident segment, and a second signature for the system image resident segment, the first signature, and the system image dynamic loading segment. That is, the server needs to create two signatures for the image of the secure operating system. FIG. 4 is a schematic diagram of two times of signature for a system image according to an embodiment of the present application. First, image signature (image 1 signature) is performed once on an image 1 (including a system image resident segment and a fixed mapping-area filling value). Then, signature (image 2 signature) is performed for a second time by using the image 1, the image 1 signature, and the dynamic loading segment as an image 2. Then, the image 2 and the signature 2 (that is, the entire image+signature 1+signature 2) are encrypted once (which may be encrypted by using a symmetric key). Asymmetric keys are used for both the signature 1 and the signature 2. The server side holds a private key for signature, and the processor of the secure element holds a public key for verification.

As far, the server side completes a process of dividing the image of the secure operating system and encrypting the signatures. From a perspective of a use time sequence, for the terminal device side (a mobile phone is used as an example subsequently), processes such as installing the secure operating system, starting and running the secure operating system, and upgrading the secure operating system may be included.

For a process in which a secure element on the mobile phone side (the secure element) installs or upgrades the secure operating system, before the mobile phone side downloads the image file of the secure operating system from the server, verification needs to be performed by a processor of the secure element (validity of the system image can be determined only in this way). Therefore, the image file needs to be first loaded to a memory (optionally, using a RAM as an example) of the secure element, and then written to an external storage (optionally, using an NVM as an example) for the secure element. In this process, the secure element first needs to decrypt and verify the secure operating system loaded to the processor. The processor may perform or complete the following functions.

In a possible implementation, the image of the secure operating system further includes a first signature for the system image resident segment, and a second signature for the system image resident segment, the first signature, and the system image dynamic loading segment. The processor of the secure element is further configured to: verify the second signature, encrypt the system image resident segment and the first signature as a whole after verification on the second signature succeeds, and migrate content obtained by encrypting the system image resident segment and the first signature as a whole to the external storage for the secure element. Specifically, because the server side has divided the image file of the secure operating system into the resident segment and the system image dynamic loading segment, performs signature twice, and performs encryption once, further, after obtaining the image file of the secure operating system, the mobile phone side further needs to decrypt and verify the signed and encrypted secure operating system image to verify that the secure program obtained from the server is valid and complete. For example, the processor 1011 in the secure element loads the entire signed and encrypted image file obtained by using the general-purpose processor system 100 to the RAM 1012 in the secure element; and first decrypts the entire image file by using a symmetric key stored in the secure element, then verifies the second signature by using a public key held in advance (that is, known in advance and negotiated with the server in advance), to verify validity (including authenticity and integrity) of the image file.

Further, after decrypting and verifying the secure operating system loaded to the processor, the secure element still needs to internally ensure security of the image of the secure operating system on the mobile phone, including ensuring upgrade security of the operating system, loading and running security of the operating system, and the like. Therefore, when writing the secure operating system to the external storage for the secure element, the processor of the secure element needs to separately perform security processing on the system image resident segment and the system image dynamic loading segment again, to perform or complete the following functions.

For the system image resident segment:

After verification on the image 2 signature succeeds, for the image 1, after the entire image file is decrypted, the decrypted file includes (plaintext image 1+image 1 signature). If the decrypted file is directly written to the external NVM, although validity of the image 1 can be ensured, privacy of the image 1 cannot be ensured. Therefore, before the decrypted file is written to the NVM, the processor of the secure element needs to re-encrypt (plaintext image 1+image 1 signature). (plaintext image 1+mage 1 signature). Re-encryption can still use a symmetric key, and the symmetric key may be a local key stored inside the secure element. In this case, the processor of the secure element completes a process of writing and storing the image 1 into the NVM in a signature-then-encryption approach.

Figure 5:
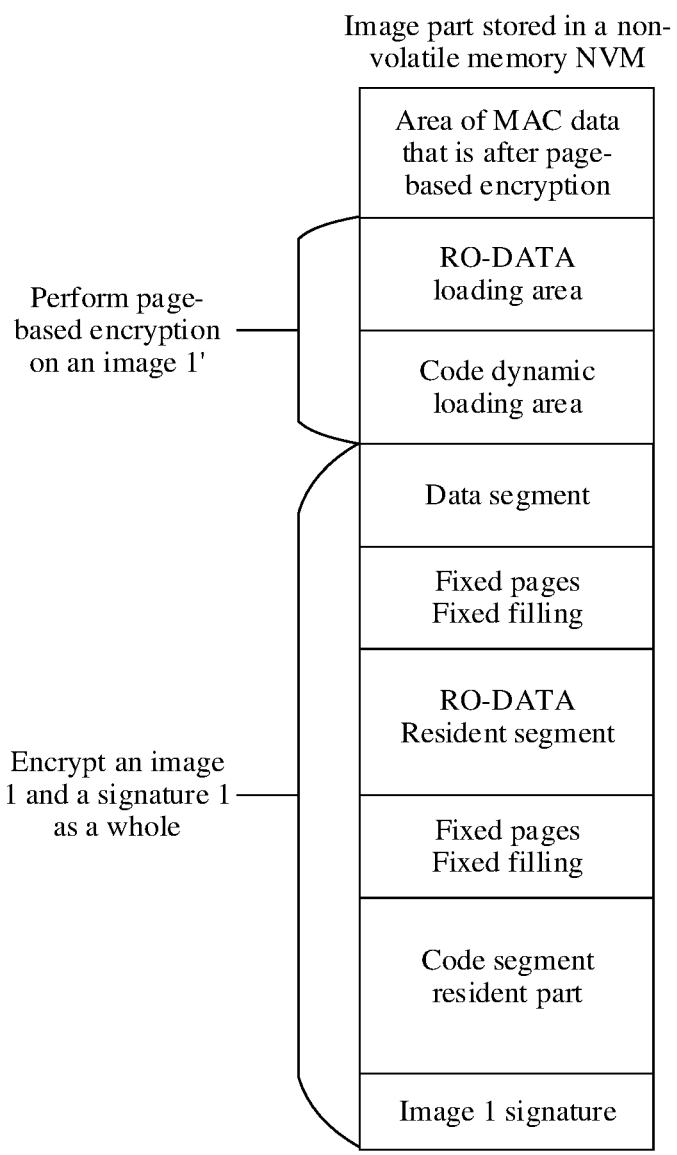
FIG. 5 is a schematic structural diagram of migrating a system image to an external storage according to an embodiment of the present application.

For the system image dynamic loading segment:

After verification on the image 2 signature succeeds, for an image 1' (a part in the image 2 except the image 1 and the signature 1), there is only the plaintext image 1' after the image 2 is decrypted and the signature 2 is verified. Therefore, before writing the image 1' to the NVM, the processor of the secure element also needs to perform encryption and signature processing on the plaintext image 1', to ensure validity and privacy of the image 1' stored in the NVM. However, a file in the image 1 is a memory resident area, and in a subsequent startup loading process, the file only needs to be directly loaded from the NVM to the RAM; and the image 1' is a system image dynamic loading segment. Therefore, a difference from the image 1 that is directly signed and encrypted lies in that, a code segment or an RO-DATA segment in the area is flexibly and dynamically scheduled to the memory after being started and run. In this case, it is very likely that only a small segment or several small segments are selected each time. Therefore, to ensure security of the code segment or the RO-DATA of the system image dynamic loading segment, this application provides a page-based encryption manner, to divide all data in the system image dynamic loading segment, and separately perform security processing on and store the pages obtained through division. FIG. 5 is a schematic structural diagram of migrating a system image to an external storage according to an embodiment of the present application.

In a possible implementation, the processor may be configured to divide the system image dynamic loading segment into a plurality of pages, where each of the plurality of pages includes some content of the system image dynamic loading segment. The processor further performs security processing on each of the plurality of pages, and migrates each security-processed page to the external storage for the secure element. Optionally, the security processing includes performing encryption and generating a message authentication code MAC. A function of the MAC is similar to that of the signature, but because a symmetric key is used, a calculation amount and calculation complexity are greatly reduced compared with those of asymmetric keys for the signature. Therefore, the MAC is applicable to page-based encryption in this application (because there are a larger quantity of times of encryption after paging).

Figure 6:
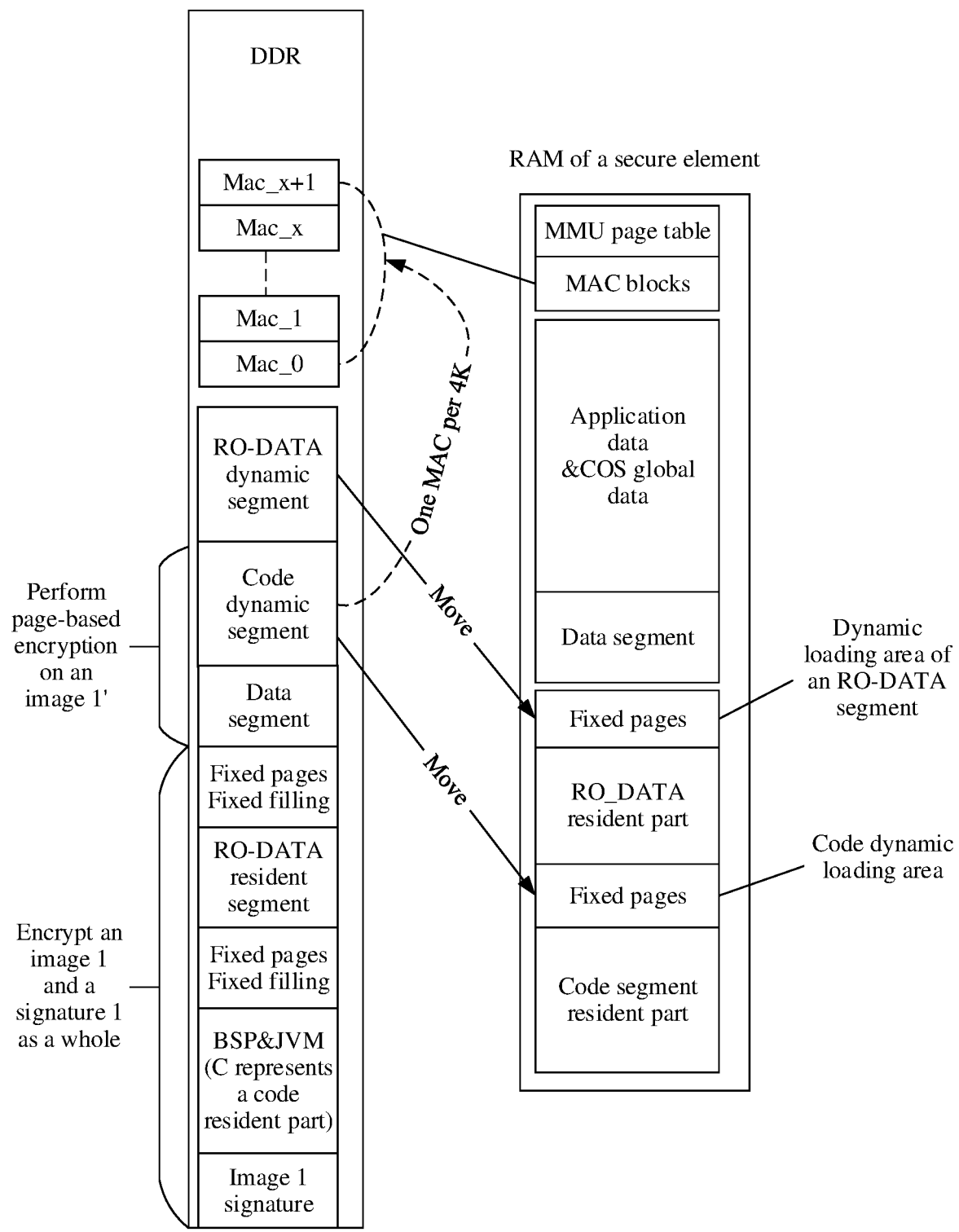
FIG. 6 is a schematic diagram of a mapping relationship between an external storage and a memory of a secure element according to an embodiment of the present application.

After the secure element processor of the secure element performs page-based encryption on the image 1', and performs MAC processing on the image 1', encryption and MAC generation operations on the image 1' are complete. In this case, the processor of the secure element writes the security-processed image 1' to the NVM. Optionally, when the image 1' is written to the NVM, a page-based encryption area and MAC data used for page-based encryption may be separately placed, that is, MACs for all pages may be stored in other areas different from the page-based encryption area. FIG. 6 is a schematic diagram of a mapping relationship between an external storage and a memory of a secure element according to an embodiment of the present application. MACs in the FIG. 6 may be understood as being separately stored and separately obtained. In a possible implementation, the security processing further includes: encrypting all of a plurality of MACs for a plurality of pages; or encrypting a MAC for each of the plurality of pages. Encryption keys for different MACs are different. Specifically, the processor may perform privacy protection on the MAC, to further ensure security of the system image dynamic loading segment.

The following describes, by using an example, how to perform page-based encryption and page-based MAC generation on the system image dynamic loading segment in this application.

First, the processor of the secure element divides the image file 1' in the system image dynamic loading segment based on each page with 4K bytes (which may be understood as other bytes). For example, an image size of the system image dynamic loading segment is 100K, and in this case, the image can be divided into 25 pages.

Then a MAC is generated for each of the pages of the image 1'. Optionally, a symmetric key, and an AES-CMAC algorithm or an SHA256 algorithm may be used. A MAC is generated for each page. For example, after a MAC is generated for a 4K plaintext, where the MAC includes 32 bytes/16 bytes, the MAC is encrypted into a 32-byte/16-byte ciphertext. Finally, for a 100 KB image, the MAC is about 800/400 bytes. Then, the 4K plaintext on each page is encrypted, for example, the 4K plaintext is encrypted into a 4K ciphertext. Optionally, the encryption key is a symmetric key, and is stored in the secure element. Optionally, the pages of the mirror 1' need to be encrypted, the MACs corresponding to the pages also need to be encrypted, and a key for encrypting the pages may be the same as or different from a key for encrypting the MACs. If the keys are the same, the entire (plaintexts of the pages+MACs) can be directly encrypted. If the keys are different, the plaintexts of the pages are encrypted and then the calculated MACs are encrypted. For example, if the entire MAC area is comparatively small, the MAC area may be moved to a fixed location of the RAM of the secure element at a time during startup, and resides in the fixed location after verification succeeds, so as to avoid moving and verification during each missing page interrupt, thereby improving performance.

Further, an encryption key used for encrypting each page is associated with a virtual address of the page, and encryption keys for different pages are different.

This can prevent a decryption disorder caused by incorrect decryption between pages, thereby ensuring security. Examples are as follows:

1. A secure element (which is assumed as a secure element chip) has a unique symmetric key Kroot for each device. The key can be obtained only from the inside of the secure element and cannot be obtained externally.

Figure 7:
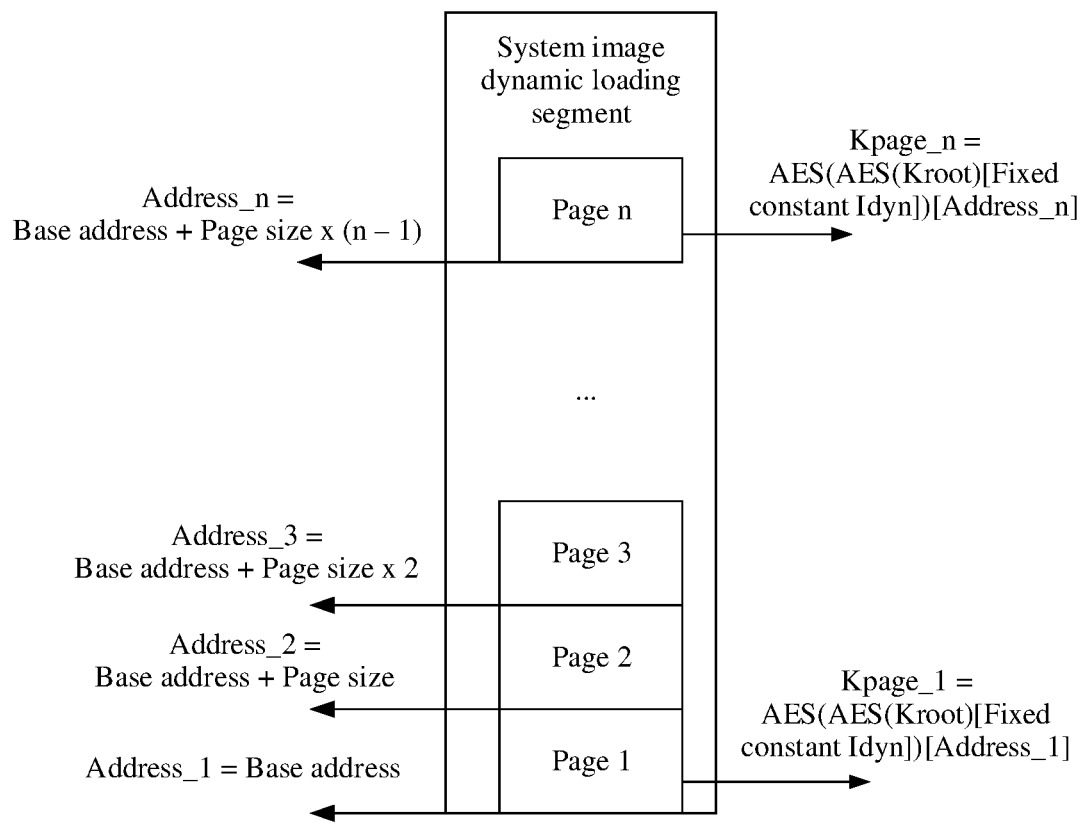
FIG. 7 is a schematic diagram of performing page-based encryption based on a virtual address according to an embodiment of the present application.

2. A data key for each page may be processed in a manner shown in FIG. 7. FIG. 7 is a schematic diagram of performing page-based encryption based on a virtual address according to an embodiment of the present application.

3. First, an advanced encryption standard (Advanced Encryption Standard, AES) operation is performed on Kroot and a fixed constant Idyn, to derive Kdyn. This Kdyn is a master key used to dynamically load a page.

4. Different keys for all pages are derived by performing an AES operation again on values of addresses of the pages and Kdyn.

Further, in a process of performing page-based encryption and calculating the MAC, a technical function count value of a one-time programmable (One Time Programmable, OTP) image replay protected segment in the secure element needs to be used to prevent rollback.

In a possible implementation, the secure element further includes a one-time programmable chip OTP. An encryption key for each of a plurality of pages is associated with an OTP count value; and/or a MAC for each of a plurality of pages is associated with a count value of the OTP of the secure element. Paging data security processing: A method in which a MAC and an OTP count value participate in calculation is as follows:

1. A secure element has a unique symmetric key Kroot for each device. The key can be obtained only from the inside of the secure element and cannot be obtained externally.

Figure 8:
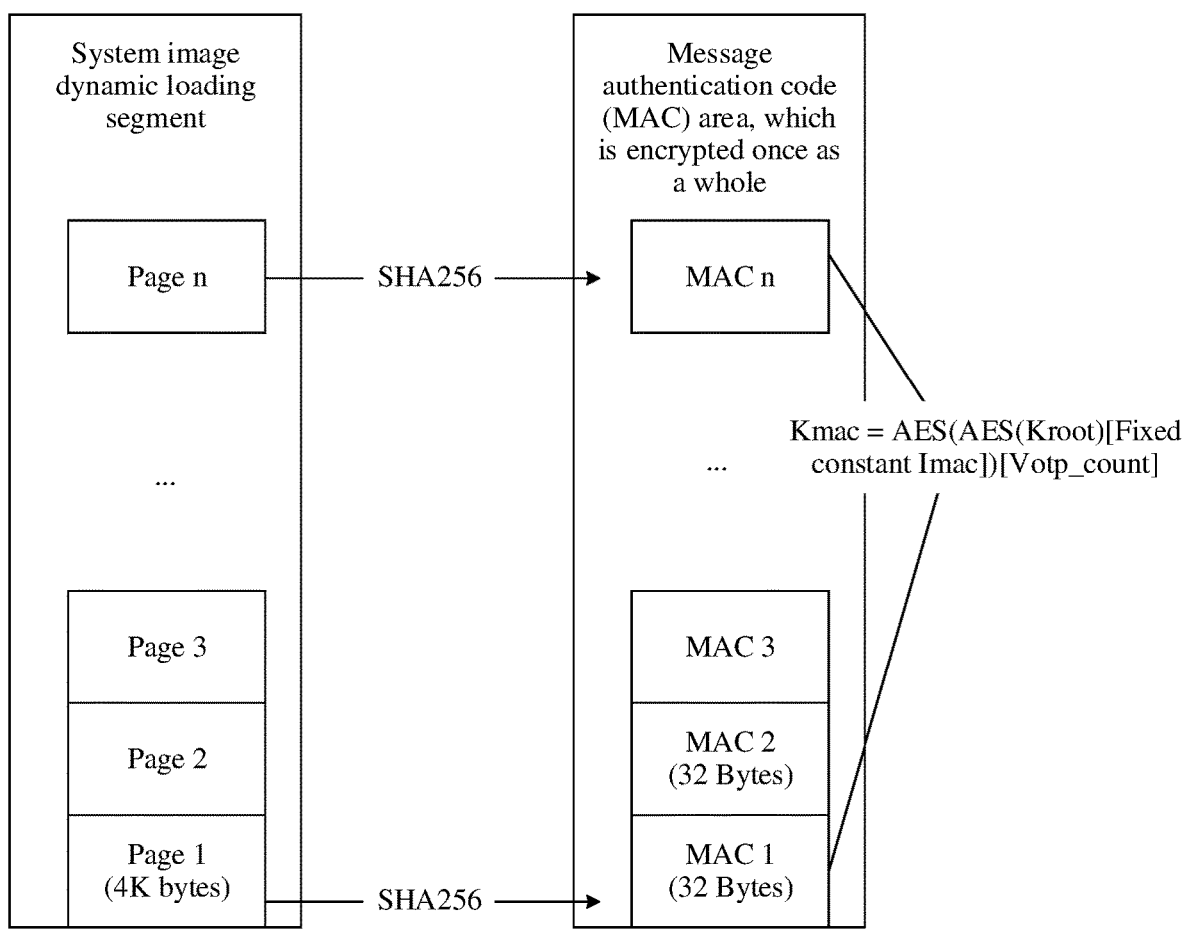
FIG. 8 is a schematic diagram of encrypting all MACs as a whole according to an embodiment of the present application.

2. A MAC area is encrypted as a whole. One solution is to associate a key for encrypting the MAC area with an OTP count. FIG. 8 is a schematic diagram of encrypting an entire MAC according to an embodiment of the present application.

3. An AES operation is first performed on Kroot and a fixed constant Imac (which is different from the foregoing Idyn) to derive Kmac_1. Then, an AES operation is performed on Kmac_1 and an OTP count value again to derive Kmac, where Kmac is used as a MAC encryption key.

It should be noted that there are many manners of association with a count. For example, exclusive OR is performed on an OTP count and 4K page content, or a MAC algorithm such as SHA256 is used for calculation after other logic calculation. Alternatively, exclusive OR may be performed on an OTP count and a hash result of an SHA256 value of 4K page content.

As far, the processor of the secure element has encrypted (image 1+image 1 signature) and has written all of a plurality of (image 1' obtained after page-based encryption+MAC). To be specific, the mobile phone obtains the image of the secure operating system from the server side, performs security verification in the RAM of the secure element, and then writes the image of the secure operating system to the NVM. Therefore, the NVM stores the signed and encrypted image 1 and the image 1' on which page-based encryption is performed and to which a MAC is added.

After the secure element on the mobile phone side installs or upgrades the secure operating system, when the secure operating system needs to be run, the operating system image stored in the external storage for the secure element is loaded to the memory of the secure element for running. However, to ensure security of the secure operating system, security processing has been performed before the operating system image is written into the external storage for the secure element. Therefore, when the secure operating system is started and run again, security verification needs to be performed on an image to be loaded to the memory. The following separately describes how to perform secure loading when operating system parts corresponding to the image 1 and the image 1' need to be started. In this process, the secure element first needs to decrypt and verify the secure operating system loaded to the processor. The processor may perform or complete the following functions.

In a possible implementation, when the security processing includes encryption and MAC generation, the security verification includes decryption and MAC verification.

Figure 9:
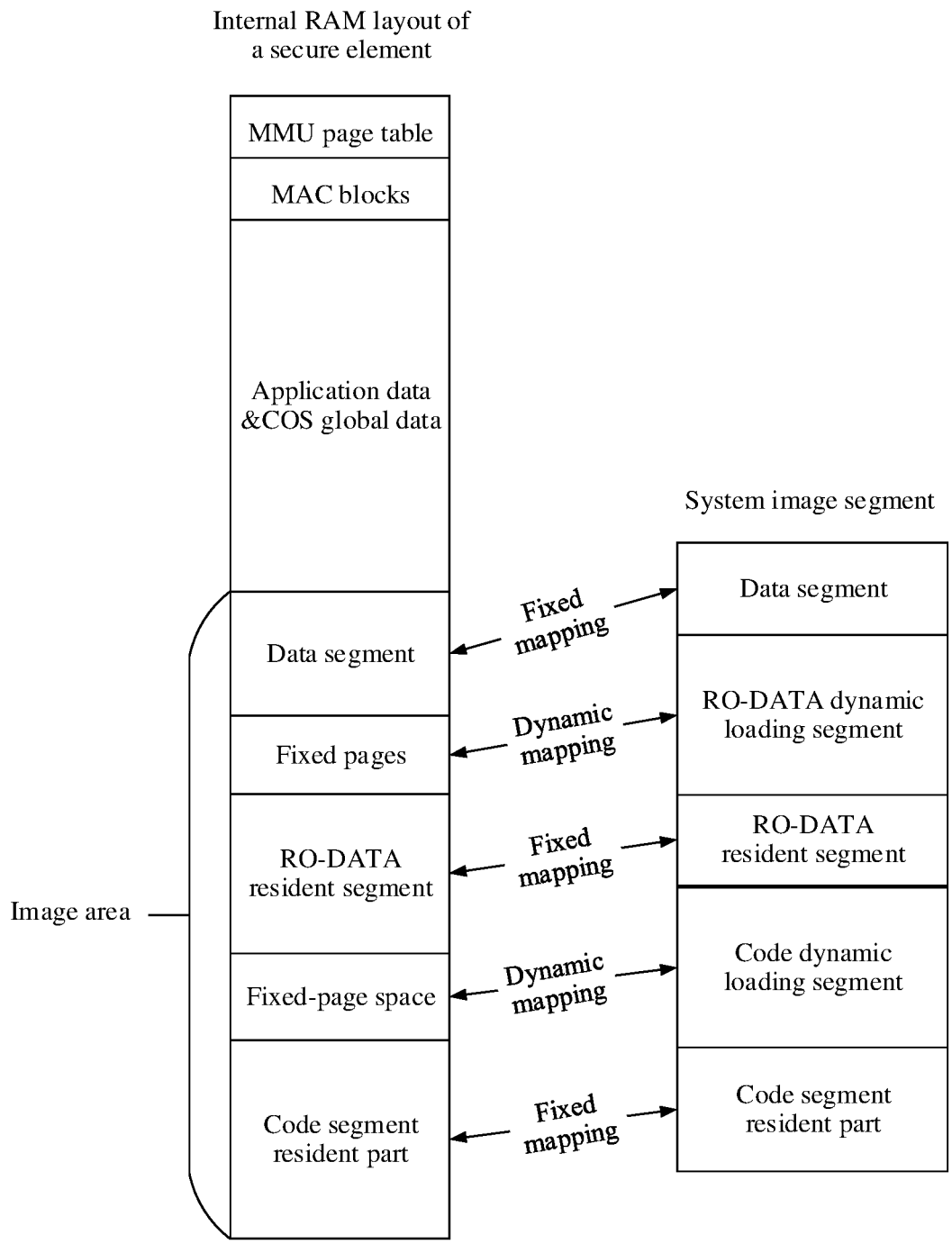
FIG. 9 is a mapping relationship diagram of migrating a system image from an external storage to a memory of a secure element according to an embodiment of the present application.

For example, when the secure operating system is started, the processor of the secure element directly loads the encrypted (image+image 1 signature) to the RAM in the secure element. However, a plurality of (image 1' obtained after page-based encryption+MAC (encrypted))s are not loaded to the processor temporarily. This is because a size of the RAM in the secure element is limited, but a system image is increasingly large. Therefore, in this application, the operating system image file (except a data segment) is divided into the system image resident segment and the system image dynamic loading segment, the system image resident segment is in the image 1 and is directly loaded to the RAM of the secure element when the system is started, and the system image dynamic loading segment is in the image 1', is not loaded to the RAM of the secure element temporarily but is loaded to the external volatile memory NVM when the operating system is started, and is loaded from the external volatile memory (for example, a DDR) to the internal RAM if necessary. Alternatively, the system image dynamic loading segment is in the image 1', the dynamic loading segment is not loaded to the RAM of the secure element temporarily when the operating system is started, but is reserved in the external NVM, and is directly loaded from the external NVM to the RAM of the secure element if necessary. FIG. 9 is a mapping relationship diagram of migrating a system image from an external storage to a memory of a secure element according to an embodiment of the present application.

Specifically, when the secure operating system is started, for the image 1, in a possible implementation, the processor of the secure element is configured to directly load the entire encrypted (image+image 1 signature) from the external NVM to the internal RAM. The entire encrypted (image+image 1 signature) actually occupies an internal RAM space. Then, a symmetric key stored in the secure element is used to decrypt the encrypted (image+image 1 signature), and then a public key corresponding to the signature 1 is used for verification. After both decryption and verification succeed, synchronous configuration is performed on an MMU page table in the RAM, and all virtual addresses of a code segment and an RO-DATA segment that are loaded to the image 1 in the RAM are mapped to valid physical pages in the secure element. As far, the processor of the secure element can normally run the code segment and the RO-DATA segment that are corresponding to the image 1.

Then, when the secure operating system is started, for the image 1', in a possible implementation, the processor is configured to configure at least one page frame in the storage space provided by the memory. Each of the at least one page frame is used to store at least one of the plurality of pages, and a quantity of pages included in the at least one page frame is less than a quantity of pages included in the plurality of pages. Further, the processor is further configured to: when running the secure operating system, load the at least one security-processed page to the memory, and perform security verification on the at least one page. The security verification is an inverse operation of the security processing. Specifically, when loading a page in the dynamic loading segment and determining that the virtual address is not effectively mapped in the memory, the processor obtains data in the page from the external storage, loads the data in the page to a specified physical page frame in the memory, and loads the corresponding MAC to the memory; and performs decryption and MAC verification, and maps a virtual address of the page to a physical address corresponding to the specified physical page frame after MAC matching succeeds.

It is assumed that the processor of the secure element directly loads all of the plurality of (image 1' obtained after page-based encryption+MAC (encrypted))s from the external NVM to an external DDR. In this case, no verification or decryption processing needs to be performed. This is because all of encryption, decryption, signature, and verification in this application are performed only by the processor in the secure element.

It is assumed that the plurality of (image 1' obtained after page-based encryption+MAC (encrypted))s continue to be stored in the external NVM without any processing, and are directly loaded from the NVM to the internal RAM only when the plurality of (page-based encryption of the image 1'+MAC (encryption))s need to be loaded.

When the processor of the secure element runs the system image dynamic loading segment, a hardware halt or a page fault occurs (error reporting manners are different based on an MMU design of the secure element or an address mapping design) because an address is not effectively mapped after a program in the processor executes a dynamic code segment or obtains a dynamic RO-DATA segment. The MMU in the processor of the secure element invokes an interrupt processing function to determine an address to which a missing page is mapped. In this case, the processor learns a virtual address of the corresponding missing page based on an ARM mechanism; finds, from the DDR or the NVM, data corresponding to the page; then moves the target page from the DDR or the NVM to a fixed page area of the RAM of the secure element; and finally, loads a MAC corresponding to the target page or all MACs to a specified physical space in the RAM of the secure element, decrypts the page, and calculates the MAC. After decryption and verification succeed, the target page is valid and is put in fixed pages; an MMU list is configured; a virtual address of the target page is mapped to the physical page, that is, a fixed page area; and mapping between the virtual address and the physical page is finally completed. Finally, the processor of the secure element returns to exceptionally interrupted context, and the program runs normally.

Optionally, when the secure operating system is upgraded, the entire image file may be first written to the external storage, and decryption and verification are not performed at this time. When the system needs to be started, the entire image file is loaded to the memory. Next, the image file is decrypted, and verification on a signature 2 is performed. After verification succeeds, the image 1 signature needs to be verified again. In addition, in this case, after the image 1 (the system image resident segment) can be run normally, page-based encryption and MAC generation are performed on the system image dynamic loading segment of the image 2 on which decryption and verification are performed, and then the system image dynamic loading segment of the image 2 is stored in the external NVM or DDR, to release a space of the RAM. When the system image dynamic loading segment of the image 2 needs to be loaded, the system image dynamic loading segment of the image 2 is loaded, decrypted, and verified again, and then is run normally.

It should be noted that system upgrade in this application is upgrading a system image corresponding to the entire secure operating system. For a patch-based update, a patch that needs to be updated may also be divided by the server side into a system image resident segment and a system image dynamic loading segment. In this way, during the update, reference may be made to operations such as dynamic loading and security processing performed by the foregoing secure element.

As far, the processor of the secure element has completed operations such as installation, startup, and running of the secure operating system.

For any one of the foregoing implementations, in a possible implementation, the processor usually includes a user mode and a privileged mode (privileged mode). To ensure system security, the at least one page frame (fixed page) is optional, or memory attributes of all page frames may be configured to be readable and writable in the privileged mode. An address mapping table is a page table segment of the MMU, and a register of the MMU is also configured to be accessible only in the privileged mode. In the present application, a system kernel is also required to process an MMU page table configuration, and all other programs are in the user mode.

For any one of the foregoing implementations, the system image dynamic loading segment further includes a system image dynamic loading segment of a code and a system image dynamic loading segment of read-only data; and/or the system image resident segment includes a system image resident segment of a code and a system image resident segment of read-only data. That is, the system image resident segment and the system image dynamic loading segment are further separately sub-divided into a code segment and a read-only data segment, so as to more effectively hit a code segment or read-only data that needs to be loaded, thereby improving read and loading efficiency.

It may be understood that, when the secure program further includes a secure application program, in a possible implementation, the secure application program includes an application program resident segment and an application program dynamic loading segment. The application program resident segment resides in the memory when the processor runs the secure application program. The processor is further configured to: divide the application program dynamic loading segment into a plurality of pages, where each of the plurality of pages includes some content of the application program dynamic loading segment; perform the security processing on each of the plurality of pages; and migrate each security-processed page to an external storage for the secure element. To be specific, for division, security processing, and verification of the resident segment and the dynamic loading segment of the secure application program, refer to related processing of the system image resident segment and the dynamic loading segment in the foregoing secure element. Details are not described herein again.

In another possible implementation, the secure program further includes a secure application program, and the processor is further configured to: divide the secure application program into a plurality of pages, where each of the plurality of pages includes some content of the secure application program; perform the security processing on each of the plurality of pages; and migrate each security-processed page to the external storage for the secure element. To be specific, for the divided dynamic loading segment, security processing, and verification of the secure application program, refer to related processing of the system image dynamic loading segment in the foregoing secure element. Details are not described herein again.

The foregoing are merely example embodiments of the present application. A person skilled in the art may make various modifications and variations to the present application without departing from the spirit and scope of the present application. For example, specific shapes or structures of all components in the accompanying drawings in the embodiments of the present application may be adjusted based on an actual application scenario.

What is claimed is:

1. A device, comprising:
a processor and a non-transitory memory;
wherein the non-transitory memory stores instructions executable by the processor, and the instructions include instructions to:
load a secure program into a secure memory and run the secure program, wherein the secure program comprises an image of a secure operating system, program code and read-only data of the image of the secure operating system are divided into at least one system image resident segment and at least one system image dynamic loading segment in a manner that pieces of the program code or pieces of the read-only data of the image of the secure operating system that correspond to functions of the secure operating system that are mandatory for the secure operating system to run are comprised in the at least one system image resident segment and pieces of the program code or pieces of the read-only data of the image of the secure operating system that correspond to functions of the secure operating system that are not mandatory for the secure operating system to run are comprised in the at least one system image dynamic loading segment, and each system image resident segment and initialized and uninitialized data of the image of the secure operating system reside in the secure memory throughout the processor running the secure operating system, wherein the image of the secure operating system comprises:
a first signature for the at least one system image resident segment; and a second signature generated from a combined group comprising the at least one system image resident segment, the first signature, and the at least one system image dynamic loading segment; and the processor is configured to:
divide the at least one system image dynamic loading segment into a plurality of pages, wherein each of the plurality of pages comprises content of the corresponding system image dynamic loading segment;
perform security processing on each of the plurality of pages to generate a plurality of security-processed pages; and
migrate each of the plurality of security-processed pages to an external storage for the device.

2. The device according to claim 1, wherein performing security processing on each of the plurality of pages comprises:
performing encryption; and
generating a message authentication code (MAC), wherein a respective encryption key for each of the plurality of pages is associated with a respective virtual address of a respective page of the plurality of pages, and encryption keys for different pages of the plurality of pages are different.

3. The device according to claim 2, wherein performing security processing on each of the plurality of pages further comprises:
encrypting a plurality of MACs for the plurality of pages as a whole; or
encrypting a respective MAC for each of the plurality of pages, wherein encryption keys for different MACs are different.

4. The device according to claim 2, further comprising a one-time programmable (OTP) chip, wherein:
a respective encryption key for each of the plurality of pages is associated with a count value of the OTP chip; or
a respective MAC for each of the plurality of pages is associated with a count value of the OTP chip.

5. The device according to claim 1, wherein:
the processor is further configured to:
verify the second signature; and
in response to successfully verifying the second signature, encrypt the at least one system image resident segment and the first signature as a whole, and migrate content obtained by encrypting the at least one system image resident segment and the first signature as a whole to the external storage.

6. The device according to claim 1, wherein the processor is further configured to:
configure at least one page frame in the secure memory, wherein each of the at least one page frame stores at least one page of the plurality of pages, and a quantity of pages comprised in the at least one page frame is less than a quantity of pages comprised in the plurality of pages.

7. The device according to claim 6, wherein the processor is further configured to:
configure the at least one page frame to allow read and write when the processor is in a privileged mode.

8. The device according to claim 6, wherein the processor is further configured to:
when running the secure operating system, load at least one security-processed page to the secure memory, and perform security verification on the at least one page, wherein performing security verification on the at least one page is an inverse operation of performing security processing on each of the plurality of pages.

9. The device according to claim 8, wherein when security processing on each of the plurality of pages comprises encryption and message authentication code (MAC) generation, performing security verification on the at least one page comprises decryption and MAC verification.

10. The device according to claim 1, wherein the secure program further comprises a secure application program, and the secure application program comprises an application program resident segment and an application program dynamic loading segment, wherein the application program resident segment resides in the secure memory when the processor runs the secure application program; and
the processor is further configured to:
divide the application program dynamic loading segment into a second plurality of pages, wherein each of the second plurality of pages comprises content of the application program dynamic loading segment;
perform the security processing on each of the second plurality of pages to obtain a second plurality of security-processed pages; and
migrate each of the second plurality of security-processed pages to the external storage.

11. The device according to claim 1, wherein the secure program further comprises a security application program, and the processor is further configured to:
divide the secure application program into a third plurality of pages, wherein each of the third plurality of pages comprises content of the secure application program;
perform the security processing on each of the third plurality of pages to obtain a third plurality of security-processed pages; and
migrate each of the third plurality of security-processed pages to the external storage.

12. The device according to claim 1, wherein:
the device is comprised in a semiconductor chip, and the semiconductor chip further comprises: a central processing unit coupled to the device, and the external storage.

13. The device according to claim 1, wherein
the device is comprised in a terminal device, and the terminal device further comprises:
the external storage, wherein the device and the external storage are disposed in different semiconductor chips.

14. A device, comprising:
a processor configured to:
divide program code and read-only data of an image of a secure operating system into at least one system image resident segment and at least one system image dynamic loading segment in a manner that that pieces of the program code or pieces of the read-only data of the image of the secure operating system that correspond to functions of the secure operating system that are mandatory for the secure operating system to run are comprised in the at least one system image resident segment and pieces of the program code or pieces of the read-only data of the image of the secure operating system that correspond to functions of the secure operating system that are not mandatory for the secure operating system to run are comprised in the at least one system image dynamic loading segment;
generate a first signature for the at least one system image resident segment; and
generate a second signature from a combined group comprising the at least one system image resident segment, the first signature, and the at least one system image dynamic loading segment, wherein the secure operating system is an operating system run by a secure element disposed in a terminal device; and a secure memory configured to provide a storage space for running of the processor.

15. The device according to claim 14, wherein the processor is further configured to control the device to send the at least one system image resident segment, the first signature, the at least one system image dynamic loading segment, and the second signature to the terminal device.

16. A method, comprising:

receiving, by a terminal device, a secure program from a server, wherein:

the terminal device comprises a secure element, the secure element comprising a processor and a secure memory, the processor and the secure memory being integrated into a semiconductor chip, the secure memory being configured to provide a storage space for the processor to load and run the secure program;

the secure program comprises an image of a secure operating system, program code and read-only data of the image of the secure operating system being divided into at least one system image resident segment and at least one system image dynamic loading segment in a manner that that pieces of the program code or pieces of the read-only data of the image of the secure operating system that correspond to functions of the secure operating system that are mandatory for the secure operating system to run are comprised in the at least one system image resident segment and pieces of the program code or pieces of the read-only data of the image of the secure operating system that correspond to functions of the secure operating system that are not mandatory for the secure operating system to run are comprised in the at least one system image dynamic loading segment;

the at least one system image resident segment and initialized and uninitialized data of the image of the secure operating system reside in the secure memory when the processor runs the secure operating system; and the image of the secure operating system comprises:

a first signature for the at least one system image resident segment; and a second signature generated from a combined group comprising the at least one system image resident segment, the first signature, and the at least one system image dynamic loading segment;

dividing, by the terminal device, the at least one system image dynamic loading segment into a plurality of pages, wherein each of the plurality of pages comprises content of the corresponding system image dynamic loading segment;

performing, by the terminal device, security processing on each of the plurality of pages to obtain a plurality of security-processed pages; and migrating, by the terminal device, each of the plurality of security-processed pages to an external storage for the secure element.

17. The method of claim 16, wherein the method further comprises:

when running the secure operating system, loading, by the terminal device, at least one page of the plurality of security-processed pages to the secure memory, and performing security verification on the at least one page, wherein performing security verification on the at least one page is an inverse operation of performing security processing on each of the plurality of pages.

18. The method according to claim 16, wherein the at least one system image dynamic loading segment resides in the secure memory only when a corresponding non-required function is used when the processor runs the secure operating system.

* * * * *